United States Patent [19]

Schlosser et al.

[11] Patent Number: 4,853,493
[45] Date of Patent: Aug. 1, 1989

[54] ELECTROGRAPHIC APPARATUS

[75] Inventors: Philip A. Schlosser, Columbus; Robert G. Kable, Dublin, both of Ohio

[73] Assignee: Scriptel Holding, Inc., Columbus, Ohio

[21] Appl. No.: 190,762

[22] Filed: May 6, 1988

[51] Int. Cl.$^4$ ............................................. G08C 21/00
[52] U.S. Cl. ..................................................... 178/18
[58] Field of Search ............................ 178/18, 19, 20

[56] References Cited

U.S. PATENT DOCUMENTS 4,435,616 3/1984 Kley ..................................... 178/18

Primary Examiner—Stafford D. Schreyer
Attorney, Agent, or Firm—Mueller and Smith

[57] ABSTRACT

The electrographic apparatus of a variety wherein a transparent resistive layer is deposited upon an insulative substrate in a manner wherein a rectangularly-shaped resistive layer region is developed having a predetermined conductivity. A conduction band is provided about the periphery of the resistive layer region having a value of conductivity enhanced with respect to the conductivity value of the resistive layer. Discrete resistive elements are positioned intermediate the conduction band and the resistive region and four terminals are provided, one at each of the four corners of the rectangular resistance region. The discrete resistance elements are designed so that a uniform impedance is witnessed with respect to the resistive layer region as witnessed with respect to each of the four terminals. The control system for the device provides for development of coordinate pair information and includes as non-volatile memory retained configurational data for initial set-up of the apparatus by the operator.

42 Claims, 15 Drawing Sheets

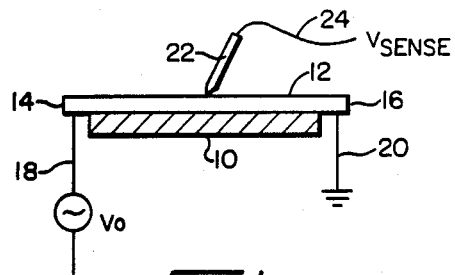
FIG. 1
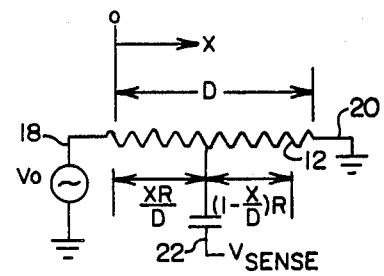
FIG. 2
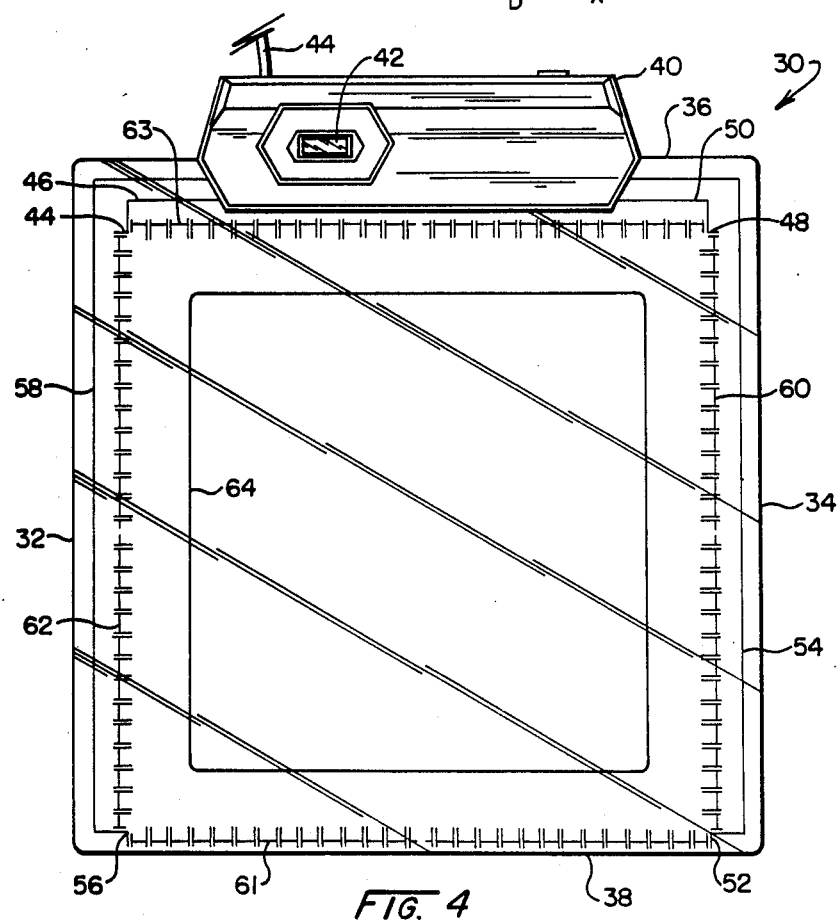
FIG. 3
FIG. 4

250

252

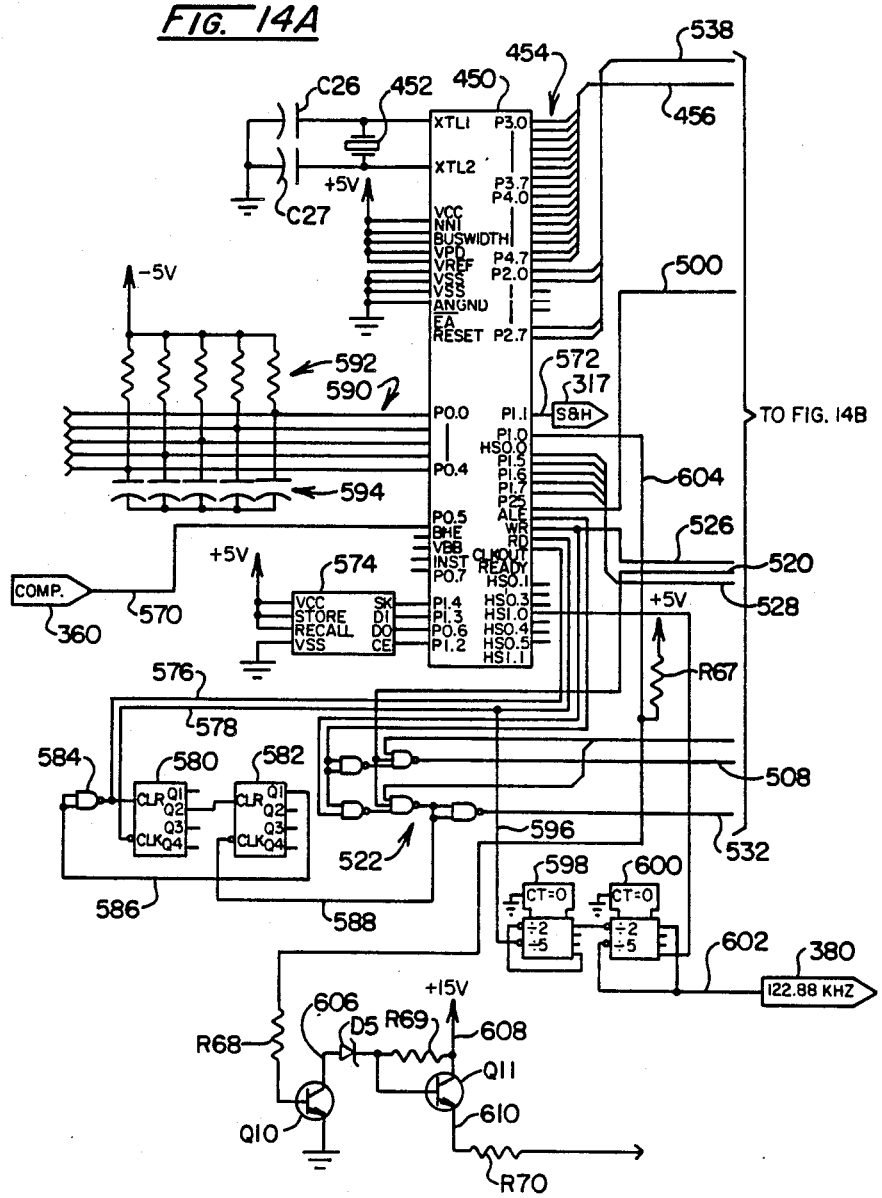

ELECTROGRAPHIC APPARATUS

BACKGROUND OF THE INVENTION

Electrographic devices in which coordinate pair signals are generated by manual positioning of a locator or the like upon an operative surface have become subjects of increasing popularity both to industry and within the consumer market. Industrial demands for the devices have occurred in conjunction with the evolution of computer graphics, computer aided design, and computer aided manufacturing systems. As these systems have been improved, a need has been observed for combining hte digitizer funcction with a visual readout such that the operational aspects of vision and information input may be combined to perform in concert before the operator. In the latter regard, an outgrowth of this combination of htese function sresides in the electronic notepad or hte like wherein business forms and the like established at a display output may be 'filled in' employing a stylus or cursor and in conjunction with character recognition software. For these advanced aspects of computerized graphics information systems to achieve practicality, the digitizer components of the system must be fabricable on a practical basis with minimal electronic supporting bulk, high noise immunity, high resolution and accuracy and at cost levels commensurate with the relatively higher volume applications contemplated.

The operation of a classic digitizer or graphics tablet has generally involved the utilization by an operator of a stylus or tracer locating device representing a writing instrument which is positioned upon the operational surface and moved across it in some electrical association. The electrographic device responds to the position of this locating stylus or tracer to generate paired analog coordinate signals which are digitized and conveyed to a computer facility. For electronic notepad applications, the computer respojndst othe paired coordinate signals to generate a pixel at a display positioned immediately adjacent the digitizer surface and at the location of the stylus or tracer. As is apparent, high resolution capabilities are required for such applications.

Early approaches to digitizer structures looked to arrangements wherein a grid formed of two spaced arrays of mutually, orthogonally disposed fine wires are embedded in an insulative carrier. One surface of this structure serves to yieldably receiuve a stylus input which yielding causes the grid components to intersect and read out coordinate signals. More recent and improved approaches to achieving readouts have been accomplished through resort to a capacitive coupling of the stylus or locating instrument with the position responsive surface to generate paired analog coordinate signals. Such capacitive coupling can be carried out either with a grid layer which is formed of spaced linear arrays of conductors or through resort to the use of an electrically resistive material layer or coating.

Particularly where applications of combining the digitizer surface with a visual readout are contemplated, the provision of the digitizer surface as a somewhat continuous resistive material shows immediate apparent advantage. Such transparent coatings additionally may be employed with digitizer tablets which are placed over drawings, photographic material, or the like for tracing profiles and generating computer data corresponding therewith.

A variety of technical problems have been encountered in the development of an effective resistive coating type digitizer technology, one of which concerns the non-uniform nature of the coordinate readouts received from the surfaces. Generally, precise one-to-one correspondence or linearity is required between the actual stylus or tracer position and the resultant coordinate signals. Because the resistive coatings cannot be practically developed without local resistance (thickness) variations the nonlinear aspects of the otherwise promising approach have required a considerable amount of inventigation and development. An earlier development in this regard is described by Turner in U.S. Pat. No. 3,699,439 entitled 'Electrical Probe-Position Responsive Apparatus and Method' issued Oct. 17, 1972, and assigned in common herewith. This approach uses a direct current form of input to the resistor surface from a hand-held stylus, the tip of which is physically applied to the resistive surface. Schlosser, et al. in U.S. Pat. No. 4,456,787, entitled 'Electrographic System and Method', issued June 26, 1984, also assigned in common herewith, describes the employment of an a.c. input signal in conjunction with such devices as well as the signal treatment of the resulting coordinate pair output signal. A voltage waveform zero crossing approach has been suggested by Turner to improve resolution in U.S. Pat. No. 4,055,726 entitled 'Electrical Position Resulting by Zero-Crossing Delay' issued Oct. 25, 1977, and assigned in common herewith. Kable, in U.S. Pat. No. 4,600,807, issued July 15, 1986, and assigned in common herewith, describes a successful signal treatment technique for transparent digitizer systems. In general, this approach utilizes a plurality of switches along the four coordinate borders of the tablet structure. An a.c. drive signal is applied from one border, while the opposite border is retained at ground for a given coordinate readout, for example in the x-axis direction. Plus and minus values are developed for generating x-coordinate pairs as well as y-coordinate pais and during the evaluation process, those switches aligned along the borders not being used at ground or as drivers are retained in a 'floating' condition. Thus the switching employed with such digitizing approaches exhibit three states for a given coordinate generating operation. In general, the utilization of a third or floating state with these switches has been the subject of some noise generation. Inasmuch as the switches are receptive to flowing currents within the digitizer surfaces during such time as they are in a floating state, any thermal responses ofthe switching components themselves will be reflected in teh overall signal process. Avoidance of this state for such switches as well as the relatively large requisite number of switches now employed in digitizer assemblages will be of considerable advantage in achieving improved operation and desired simplicity.

Substantially improved accuracies for the resistive surface type digitizing devices have been achieved through a correction procedure wherein memory retained correction data are employed with the digitizer such that any given pair of coordinate signals are corrected in accordance with data collected with respect to each digitizer resitive surface unit during its manufacture. With such an arrangement, the speed of correction is made practical and the accuracy of the devices is significantly improved. Such correction process is described by Nakamura, et al., in U.S. Pat. No. 4,650,926, issued Mar. 17, 1987, and assigned in common herewith.

In order to avoid interference from externally generated noise, hand effects, and the like, the resistivity for transparent digitizers preferably falls within predetermined acceptable ranges, for example, between 400 and 3,000 ohms per square. To achieve the higher levels of resistivity thus desired, very thin resistive coatings, for example of indium tin oxide (ITO) have been employed. However, it has been observed that, over a period of time, surface effects and the like will affect the resistivity values of a given tablet occasioning an unwanted 'drift' in such value to affect long term accuracy. To improve the long term stability of the coatings, thicker coatings have been employed in combination with discontinuities in the layer itself as described by Kable, et al., in U.S. Pat. No. 4,665,283, issued May 12, 1987, and assigned in common herewith. Improvements in performance also have been achieved through the utilization of angular shaped electrodes at corner positions as well as a conductive band or band of enhanced conductivity which is positioned intermediate the outer periphery of the digitizer device and the active area thereof as described by Nakamura, et al., in U.S. Pat. No. 4,649,232 entitled 'Electrographic Apparatus' and assigned in common herewith.

Improvements in the locators or pick-up devices themselves utilized with digitizers have been evolved to enhance overall performance of the systems. For example, an improved tracer or cursor is described by Kable et al. in U.S. Pat. No. 4,707,572, entitled 'Tracer for Electrographic Surfaces' issued Nov. 17, 1987, assigned in common herewith. Similarly, Kable describes an improved stylus structure in U.S. Pat. No. 4,695,680, entitled 'Stylus for Position Responsive Apparatus Having Electrographic Application' issued Sept. 22, 1987, and assigned in common herewith.

SUMMARY

The present invention is addressed to electrographic apparatus for generating coordinate data which exhibits significantly improved distortion control to an extent permitting important simplification of its electronic control architecture. The apparatus, system and method incorporates a boundary configuration which, while achieving important aspects of distortion control, does so without undue loss of operational surface. As a consequence, a broad range of practical applications of the resultant technology becomes available, not only in connection with digitizer tablets per se, but also for such applications as electronic notepads and the like.

With the improvements of the invention, the number of solid-state switching components required about the border of the resistive surface is substantially reduced. Such switching functions need no longer be of a three-state (ground, signal transfer and floating) configuration, and may ideally be operated in noise immune configurations to improve overall performance of the electrographic devices.

In one embodiment of the invention, enhanced coordinate data generation is achieved through simultaneous application of dual frequencies to the digitizer surface. Such higher rates of data development may find application, for example, in electronic handwriting applications and the like.

Another particular feature of the invention is to provide apparatus of the type wherein a surface is selectively accessed with respect to positional data which includes an insulative substrate and a resistive layer supported upon the substrate having an operational region extending within a operational periphery of predetermined geometric pattern and configured to exhibit predetermined values of the conductivity and resistivity, the operational periphery being spaced inwardly from the outer boundary. Terminals are mutually spaced and supported upon the substrate, and positioned adjacent the outer boundary as well as at the corners of the geometric pattern. An arrangement defining a conduction band exhibiting enhanced conductivity wiht respect to the operational region conductivity is supported upon the substrate intermediate the outer boundary and the operational periphery and a plurality of spaced, discrete resistance elements, each in electrical communication intermediate the conduction band and the resistive layer each having a resistance value selected to effect exhibition of substantially uniform electrical impedance of the layer to each terminal are provided. Further provided is an excitation signal source as well as a ground reference and a switch arrangement which is actuable for applying the ground reference to first select ones of the terminals while simultaneously applying the excitation signal source to second ones of the terminals oppositely disposed from the first ones and a control serves toa ctuate the switches to effect derivation of positional data modes.

Another feature of the invention is to provide apparatus of the type wherein the surface is selectively accessed with respect to positional data which includes an insulative substrate serving to support a resistive layer having an operational region extending within an operational periphery and configured to exhibit predetermined values of conductivity and resistivity. The operational periphery is spaced inwardly from the outer boundary. Mutuall spaced terminals are supported on the substrate and are positioned adjacent the outer boundary and the corners of a predetermined geometric pattern of the noted operational periphery to develop positional data modes. A conduction band exhibiting enhanced conductivity with respect to the operational region conductivity is supported upon the substrate intermediate the outer boundary and the operational periphery. A plurality of spaced, discrete resistance elements, each in electrical communication intermediate the conduction band and the resistive layer are provided wherein each has a resistance of value selected to effect exhibition of a substantially uniform electrical impedance of the layer to each terminal. A time varying excitation signal source is provided for deriving the first signal at a first select frequency and a second signal at a second select frequency. Switches are provided which are actuable for applying the first signal to first select ones of the terminasl while simultaneously applying the second signal to second select ones of the terminals oppositely disposed from the first ones and a control serves to actuate the switches to effect derivation of positional data modes.

Still another feature of the invention is to provide electrographic apparatus which includes an insulative substrate and a resistive layer supported upon the substrate and extending in an x-coordinate sense between first parallel, spaced-apart borders and in a y-coordinate sense between second parallel, spaced-apart border to provide a rectangular resistive layer regionhaving four corners and configured to exhibit predetermined values of resistivity and conductivity, the resistive layer region being spaced inwardly from an outer boundary. A terminal is supported upon the substrate adjacent the outer boundary for interaction with the resistive layer region at each of the noted corners and an elongate conduction band exhibiting predetermined enhanced conductivity with respect to the conductivity of the resistive layer region is supported upon the substrate intermediate the outer boundary and the first and second parallel, spaced-apart borders. A plurality of disrete, spaced, resistance elements, each in electrical communication intermediate the conduction band and the resistive layer region, and each having a value of resistance selected to effect exhibition of a substantially uniform electrical impedance of the region to each terminal are provided. Further provided is an excitation signal source and a ground reference. A switch arrangement is coupled with the terminals, the source and the ground reference, and is actuable to selectively apply the excitation signal and ground reference to the terminals. A locator is movable into adjacency with the resistance layer for recting therewith to develop position signals and a control serves to actuate the switches during a first data mode to apply the ground reference and excitation signal to first and second pairs of ther terminals selected in an x-coordinate sense and to apply the ground reference and excitation signal to third and fourth pairs of the terminals selected in y-coordinate sense during a second data mode. The control includes signal treatment features which respond to the position signals derived during the first and second data modes for deriving respective x-coordinate and y-coordinate signals.

Another feature of the invention provides electrographic apparatus which includes an insulative substrate and a resistive layer supported upon the substrate and extending in an x-coordinate sense between first parallel, spaced-apart borders and in a y-coordinate sense between second parallel, spaced-apart borders to provide a rectangular resistive layer region having four corners and configured to exhibit predetermined values of resistivity and conductivity, the resistive layer region being spaced inwardly from an outer boundary. A terminal is supported upon the substrate adjacent the outer boundary for interaction with the resistive layer region at each corner. An elongate conduction band exhibiting enhanced conductivity with respect to the conductivity of the resistive layer region is supported upon the substrate intermediate the outer boundary and the first and second parallel, spaced-apart borders. A plurality of discrete, spaced resistive elements, each in electrical communication intermediate the conduction band and the resistive layer region, and each having a value of resistance selected to effect exhibition of substantially uniform electrical impedance of the region with respect to each terminal are provided. An excitation signal source deriving a first signal at a first select frequency and a second signal at a second select frequency is provided along with switches coupled with the terminals as well as with the source and are actuable to selectively apply the first and second excitation signals to the terminals. A locator is movable into adjacency with the resistive layer for reacting therewith to develop position signals at the first and secdon signals to third and fourth pairs of the terminals selected in the y-coordinate sense during a second data mode. The control further incluse a signal treatment arrangement responsive to the position signal derived during the first and second data modes for deriving respective x-coordinate and y-coordinate signals.

A further feature of the invention is to provide apparatus of a type wherein a surface is selectively accessed with respect to positional data which includes an insulative substrate and a resistive layer supported upon a substrate having operational region extending within an operational periphery of predetermined geometric patterna dn configured to exhibit predetermined value of conductivity and resistivity. The operational perihery is spaced inwardly from the outer boundary. Mutually spaced terminals are supported upon the substrate and are positioned adjacent the outer boundary as well as the corners of the geometric pattern and a conduction band exhibiting enhanced conductivity with respect to the operational region conductivity is supported upon the substrate intermediate the outer boundary and the operational periphery. A plurality of spaced discrete resistance elements, each in electrical communication intermediate resistance of value selected to effect exhibition of a substantially uniform electrical impedance of the layer to each terminal. An excitation signal source is provided as well as a locator coupled with the excitation signal source and movalbe into adjacency with the resistive layer for applying the source thereto at a select position. A current-to-voltage converter is coupled with each of the terminals and exhibits a virtual ground thereto and has position output signals in response to the source application by the locator. Switches are actuable for collecting select position output signals in accordance with predetermined positional data modes and a control serves to actuate the switches in accordance with the data modes and for treating the collected poistion output signals toderive x- and y-coordinate signals corresponding with the locator select location.

Another feature of the invention is to provide electrographic apparatus which includes an insulative substrate which serves to support a resistive layer and which extends in an x-coordinate sense between first parallel, spaced-apart borders and in a y-coordinate snese between second parallel, spaced-apart borders to provide a rectangular resistive layer region having four corners and configured to exhibit predetermined values of resistivity and conductivity. The resistive layer region is spaced inwardly from an outer boundary. A terminal is supported upon the substrate adjacent the outer boundary for interaction with the resistive layer region of each corner. An elongate conduction band exhibiting enhanced conductivity with respect to the conductivity of the resistive layer region is supported upon the substrate intermediate the outer boundary and the first and second parallel, spaced-apart borders. A plurality of discrete, spaced resistance elements, each in electrical communication intermediate the conduction band in the resistive layer region and each having a value of resistance selected to effect exhibition of substantially uniform electrical impendance of the region to each terminal are provided. An excitation signal source is further provided as well as a locator which is coupled with the excitation signal source and is movable into adjacency with the resistive layer for reacting in signal transfer relationship therewith at a select location. A current-to-voltage converter is coupled with each terminal which exhibits a virtual ground thereto and provides position output signals in response to the locator means reaction. Switches are actuable for collecting select position output signals and a control serves to actuate the switches during a first data mode to effect collection of the position output signals from first and second pairs of the terminals selected in the x-coordinate sense and to effect collection of the position output signals from third and fourth pairs of the terminals selected in the y-coordinate sense during a second data mode. The control includes a signal treatment arrangement which is responsive to the collected position signals derived during the first and second data modes for deriving respective x-coordinate and y-coordinate signals.

Other objects of the invention will, in part, be obvious and will,in part, appear hereinafter.

The invention, accordingly, comprises the apparatus possessing the construction, combination of elements, and arrangement of parts which are exemplified in the following detailed disclosure.

BRIEF DESCRIPTION OF THE DRAWINGS

FIG. 1 is a schematic representation of a one-dimensional model of the electrographic apparatus of the invention;

FIG. 2 is a schematic equivalent circuit of the model of FIG. 1;

FIG. 3 is a schematic idealized curve showing voltage distribution across the resistive layer represented in FIG. 1;

FIG. 4 is a top view of an electrographic digitizer tablet according to the invention;

FIGS. 14A and 14B combine to show an electrical schematic diagram illustrating control circuit components of the electrographic device of the invention;

DETAILED DESCRIPTION

Figure 5:
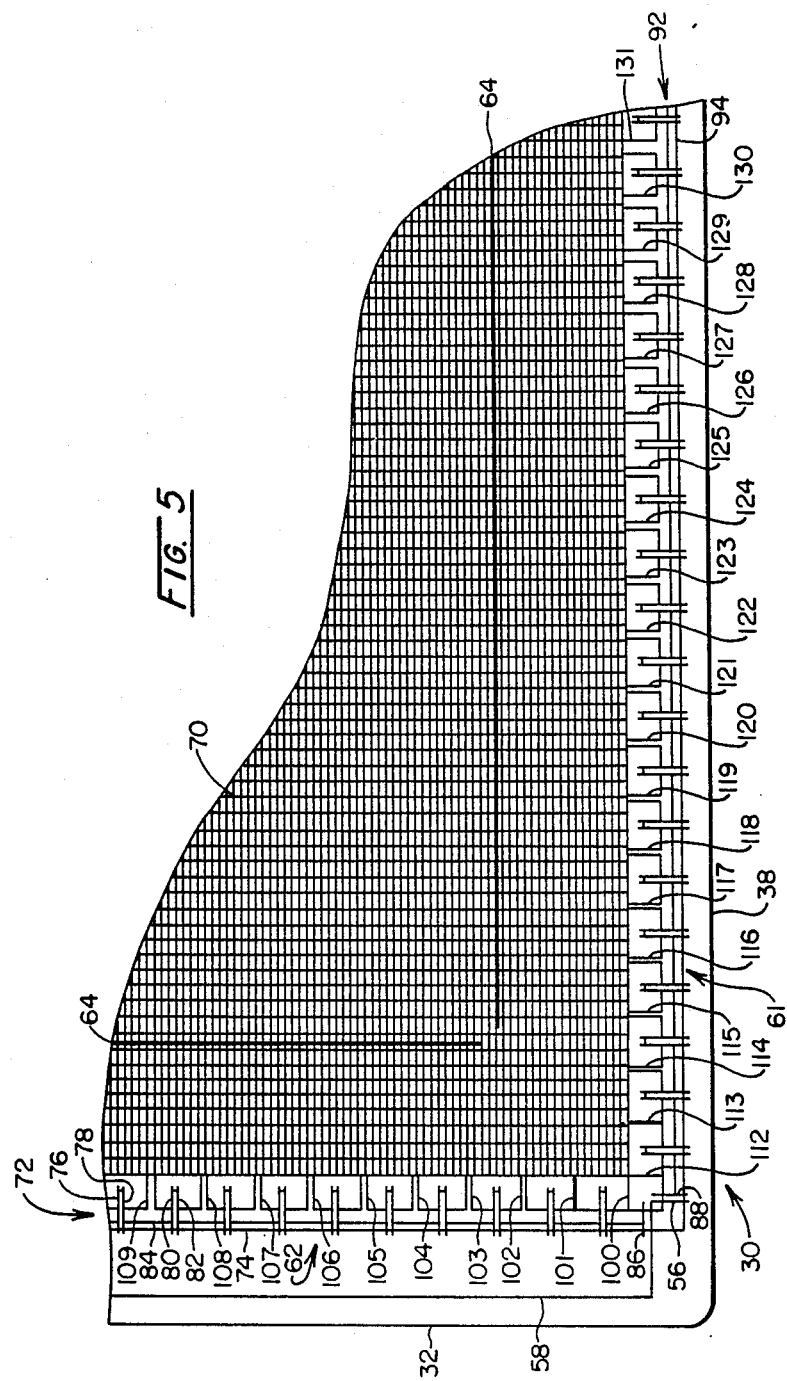
FIG. 5 is a partial top view of the electrographic tablet of FIG. 4 showing resistive layer patterns, conduction band structure, and discrete resistance elements employed with the device.

As a preliminary consideration of the general approach taken with resistive surface electrographic technology, reference is made to FIGS. 1 and 3 wherein an idealized one-dimensional model is revealed. In FIG. 1, an insulative substrate 10 such as glass or the like is shown supporting a resistive layer of, for example, indium-tin oxide 12. Electrodes 14 and 16 are shown coupled to the resistive layer 12 at the opposite ends or borders thereof. Electrode 14 is coupled with an a.c. source designated $V_0$ from line 18, while electrode 16 is coupled to ground through line 20. A pick-up or locator such as the stylus 22 is positioned adjacent or in contact with the resistive layer 12 at any given location and for example through capacitive coupling serves to pick-up a voltage output at line 24, such voltage being labelled $V_{sense}$. The equivalent circuit for this idealized one-dimensional model is represented in FIG. 2 where the resistive layer 12 is shown as a resistor and the distance of the stylus 22 from the edge of the resistor closest to the source $V_0$ is represented as 'X' and the distance between electrodes 14 and 16 is represented as 'D'. The fraction of resistance of layer 12 extant from the source of voltage excitation to the location, X, may be represented as XR/D, while the distance from the location of the stylus 22 to the opposite electrode as at 16 or line 20 may be represented as the labelled value (1-X/D)R. The corresponding idealized value for V sense is shown in FIG. 3 as being linear, as represented at the curve 26. As a result of a variety of phenomena, such linearity becomes an approximation, however, achieveing adequate linearity prior to the application of necessary electronic treatment will be seen to be highly desirable.

To derive signals representing coordinate pairs with respect to the position of the stylus 22 on the resistive surface 12, measurements of the voltage $V_{sense}$ are made along orthogonally disposed axes designated x and y. Through the utilization of switching, the application of the voltage source as through line 18 and the connection of ground as through line 20 as shown in FIG. 1 are alternately reversed for each of the x and y coordinates. With the values thus obtained for each designated x and y coordinate, a difference/sum voltage ratio is determined to obtain a coordinate position signal or coordinate pair signal. As a somewhat oppositely considered topology, the coordinate pair deriving signal may be applied through the stylus 22 or locator itself. In that form of arrangement, similar switching takes place, however, receiving voltage to current converters are employed exhibiting virtual ground which are polled by switching to develop coordinate pair information.

Looking to FIG. 4, a digitizer tablet implementation of the electrographic technology of the invention is represented generally at 30. Such tablets as at 30, employing this technology, may be developed having a broad variety of overall shapes and sizes from small and compact to relatively large, for example 36 inches by 24 inches. The devices generally are structured as a patterned layer of indium tin oxide (ITO) which is deposited over a transparent glass substrate. The borders of the glass substrate in a y-coordinate orientation may be observed at 32 and 34, while the outer borders of the glass for the y-coordinate considerations are seen at 36 and 38. Of course, such borders may take any of a variety of geometric shapes. The resistive layer which is positioned upon the glass substrate of tablet 30 is transparent and thus not visible, but is deposited and patterned such that the deposit itself is thick enough to avoid resistivity drift due to surface effets while maintaining desired resistivity characteristics. Techniques for achieving this stability are described in the above-noted U.S. Pat. No. 4,665,283 incorporated herein by reference. In general, for smaller digitizer tablets having overall boundary size of 12 inches by 12 inches, for example, a generally desirable value of resistivity of 600 ohms per square is employed along with an excitation, for example at 120 KHz. For larger tablets, the resistivity preferably is altered to 900 ohms per square. However, for typical applications of digitizer tablets, it is desirable to maintain the resistivity under about 1,000 ohms per square to avoid hand effects and the like. Also seen in FIG. 4 is a plastic housing 40 which retains the circuitry employed in operation of the tablet and this housing 40 additionally is seen to support a readout or display 42 which is utilized to prompt the operator in proper set-up of the digitizer for use with a given computer. In the latter regard, an ouput cable to the computer is shown at 44. Also seen in FIG. 4 are linear shaped conductors formed, for example, of a silver ink or the like, which extend from the circuitry within housing 40 to the corners of the resistive layer deposition or operational periphery of the tablet 30. In accordance with the invention, only four corners are primarily accessed by the circuitry of the device. In this regard, an L-shaped electrode or terminal 44 is seen coupled to the circuitry within housing 40 via a deposited thin silver lead 46. In similar fashion, an L-shaped terminal 48 is positioned at the upper right corner of the resistive region and is connected to the circuitry of the tablet 30 by thin deposited line 50. The lower right corner of the tablet 30 is addressed by an L-shaped terminal 52 which is coupled to the electronics within housing 40 via thin deposited conductive line 54 and, lastly, L-shaped terminal 56 at the lower left corner of the resistive layer is coupled to the electronics of housing 40 via deposited thin line or lead 58.

Additionally seen on the surface of the tablet 30 is a rectangular configuration of shorting bars which will be seen to be positioned at the periphery of the resistive layer or surface or operational region and which are formed as deposited silver lines as are represented at 60–63. Additionally shown on the tablet is a non-operational boundary designation 64 which is non-functional from an electronic sense but which apprises the operator of the desired performance region for using tablet 30. Generally, the boundary 64 is formed as an ink deposition on a non-functioning component of the structure, for example the opposite side of the glass substrate.

Turning to FIG. 5, a representation of the pattern of the resistive ITO deposition as well as the conduction band structuring as combined with the shorting bar structures 60–63 and the geometric configuration of a plurality of spaced, discrete resistive elements is revealed. The pattern by which the resistive layer region or operational region of the tablet 30 may be provided to achieve desired resistivity and drift free performance is revealed in general at 70, the solid rectangular pattern lines representing the glass substrate. This tablet 30 geometry futher includes a conduction band which is formed of deposited ITO in conjunction with the earlier-described shorting bar configuration. In this regard, a conduction band represented generally at 72 is shown positioned intermediate the outer boundary 32 of the tablet 30 and the outer periphery of the resistive layer or grid pattern 70. Band 72 is formed of an ITO deposition represented as spaced lines 74. Over this deposition 72, there is positioned on earlier-described shorting bar structure 62. Looking, in particular, to the latter structure, the shorting bars are shown to include, for example, two spaced parallel bars as at 76 and 78 between which is a deposition of ITO. Similarly, an identically shaped pair of shorting bars are shown at 80 and 82 and a short lead 84 is seen connecting the two shorting bar structures. The shorting bars are formed as a deposited conductive material such as a silver ink and are seen to be in electrical communication with the conduction band deposition 74. The structures of the shorting bars as at 76, 78, 80 and 82 are identical with the exception of those first components at each corner electrode, for example as at 86. Note additionally that most of the bars are paired, i.e. 76 and 78 and that the ITO layer of the conduction band over which they are deposited extends outwardly between them. By comparison it may be observed that the initial shorting bars adjacent to the L-shaped terminal 56 are singular as opposed to being paired and are of lesser lengthwise extent.

A similar conduction band is provided adjacent outer border 38 as at 92 which is seen to be formed of an ITO deposition 94 over which the shorting bar structure 61 is deposited. This same geometry is repeated about all four borders 32, 34, 36 and 38 of tablet 30.

Additionally formed as an ITO deposition upon the glass substrate of tablet 30 are a plurality of spaced, discrete resistance elements. For example, resistance elements 100–109 are shown in electrical communication between the resistive layer represented at grid 70 and conduction band 72 and contact the conduction band intermediate the shorting bar structures. Note that the widthwise extent of each of these resistive elements commencing at element 100 and extending, for example, to element 109, increases so that the impendance represented thereby lowers. Generally, this increase in widthwise extent of the resistive elements continues until the midpoint between any two adjacent terminals, for example terminals 56 and 44 or the same terminal 56 and adjacent terminal 52 (see FIG. 4). In similar fashion, a plurality of spaced, discrete resistance elements as at 112–131 are seen to extend from conduction band to resistive layer grid along border 30. As before, these elements are seen to exhibit increasing widthwise dimension in the progression thereof from element 112 through 131 and this increasing dimension continues to the resistive region periphery midpoint. The thicknesses of these resistive elements for each of the borders and, in effect, the resistance value thereof, is selected to effect an exhibition of a substantially uniform electric impedance of the resistive layer 70 to each of the terminals as at 44, 48, 52, and 56 forms a digitizing topology generally referred to as 'corner driven'. Looking additionally to FIG. 6, a schematic representation of this type of corner drive wherein the excitation signal as applied to the resistive layer is revealed in conjunction with a generalized representation of tablet 30. The general switching technique employed with the tablet 30 is one for carrying out a difference/sum ratio coordinate determination. Accordingly, in FIG. 6, the tablet 30 and its resistive layer are shown of generally rectangular shape being accessed by a stylus or locator 134 at some point (x, y). The resistive of tablet 30 is shown having designated $x+$ and $x-$ axes as well as $y+$ and $y-$ axes, the intersection therebetween being essentially at the center of the rectangularly configured tablet 30.

Assuming that the coordinate system shown ranges from $+1$ to $-1$ in both the x and y directions, a signal representing any given coordinate (x, y) pair can be determined by measuring the current and voltage value picked up by the locator 134 under a procedure where the alternating voltage source or time varying excitation source initially is applied to two adjacent corners of the resistive layer in one coordinate direction while ground reference is applied to the oppositely disposed adjacent corners. This procedure then is reversed for the first coordinate direction and the combined readings may be used to determine one coordinate. The procedure then is carried in the opposite coordinate sense. For example, arbitrarily designating that the output of stylus 134 is to be termed XPLUS when an alternating current source is applied along the x+ coordinate direction at appropriate adjacent corners of table 30 while simultaneously, ground is applied to the opposite, x− coordinate adjacent corners; arbitrarily designating XMINUS to be the signal at stylus 134 when the opposite condition obtains, wherein the alternating current source is applied to the x-coordinate adjacent corners of the resistive layer and ground is applied to the oppositely-disposed, x+ edge; designating YPLUS to be the signal at locator 134 when the alternating signal source is applied to the adjacent corners of the resistive layer at the y+ coordinate and ground is applied to the opposite or y− coordinate adjacent corners; and designating YMINUS to be the signal derived at locator 134 when the alternating current source is effectively applied along the adjacent corners of resistance of a resistive layer at the y− coordinate position thereof, while ground is applied at the adjacent corners of sheet 30 represented at the y+ side. With the arrangement, coordinate pair signals may be derived, however, only four electrode locations, the corners of the resistive area, are employed. Essentially the same type of geometry in switching is employed for the utilization of the locator 134 as the injection of current to the resistive layer.

With the arrangment shown, signal values may be employed with a difference/sum ratio, to derive paired coordinate signals for any position of the locator 134 on the resistive surface as follows:

$$\text{position } x = \frac{(X\text{PLUS}) - (X\text{MINUS})}{(X\text{PLUS}) + (X\text{MINUS})}$$

$$\text{position } y = \frac{(Y\text{PLUS}) - (Y\text{MINUS})}{(Y\text{PLUS}) + (Y\text{MINUS})}$$

Unlike earlier coordinate pair derivation techniques, the driving arrangement of the instant invention is binary in form. In this regard, the y-coordinate borders do not have terminals with associated switches which 'float' during excitation for x-coordinate information and vice versa. Generally, the above sum/difference ratio procedure is referred to as 'normalization'.

Figure 6:
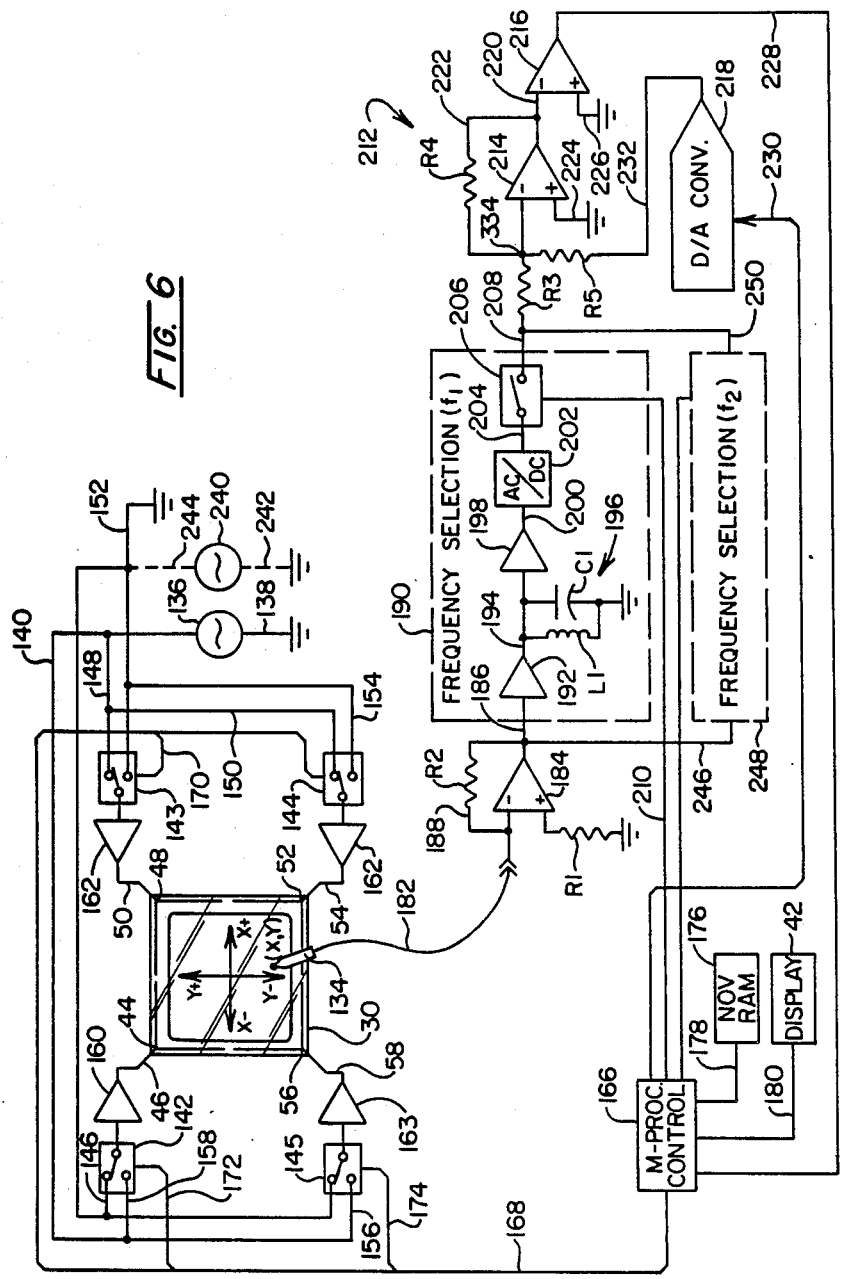
FIG. 6 is a schematic representation showing the circuit and switching components of a preferred embodiment of the instant invention.

FIG. 6 shows an alternating current source or excitation signal source at 136 coupled between groun via line 138 and to a distribution line 140. Line 140 extends to one pole of binary switches 142-145. In this regard, line 140 is seen directed to one pole of switch 142 via line 146 and is directly coupled to one pole of switch 145. Similarly, a line 148 connects line 140 with one pole of switch 143 and a line 150 extending from line 148 is coupled to one pole of switch 144. Ground is made available for the corner switching arrangement from lines 152 and 154 to the poles of respective switches 143 and 144, while the same ground is applied via lines 156 and 158 to one pole of respective switches 145 and 142.

The selected ground or excitation source input to the resistive layer tablet 50 is provided from switches 142-145 through respective drivers 160-163. And these drivers, in turn, are coupled to respective terminals 44, 48, 52, and 56. The same lead lines as disclosed in connection with FIG. 4 are shown coupling the terminals with the outputs of the noted drivers 160-163. Control over switches 142-145 is developed from a microprocessor and related I/O circuit as represented at block 166. The control inputs from the microprocessor control 166 are represented in general lines by 168 and 170 leading, respectively, to solid-state switches 144 and 143 and via lines 168, 172, and 174 leading, respectively, to switches 142 and 145. Microprocessor control function 166 is shown being associated with a non-volatile memory at block 176 via line 178 as well as with the earlier-described display 42 (FIG. 4) via line 180.

The output of stylus or locator 134 is represented as being directed to input or signal treatment circuitry via a cable 182. Typically, the transmission of the signal via cable 182 has been found desirable to incorporate an operational amplifier as a pre-amplification stage within the stylus or cursor 134 itself so as to constitute the cable 182 as a low impedance source. Improved signal-to-noise ratios are achieved with such an arrangement. Cable 182 is seen connected to an initial input amplification stage 814 which may, for example, be provided as an operational amplifier. A positive input terminal of amplifier 184 is coupled to ground through a resistor R1, while the negative input terminal thereof is coupled to receive the signal from cable 182. The output of this amplification stage at line 186 is seen to be directed through a conventional feedback path incorporating feedback path resistor R2 and line 188. Line 186 is seen to be directed to a frequency selection (f1) circuit represented within dashed boundary 190. The input stage of the circuit 190 at 192 is provided as a voltage-to-current converter, the output at line 194 of which is directed through a high-Q tank circuit represented generally at 196 as incorporating an inductor L1 and capacitor C1. From the circuit 196, line 194 is seen directed through a buffer stage 198, the output of which at line 200 is directed to an a.c.-to-d.c. converter represented at block 202. The output of converter 202 at line 204 extends through a sampling or switching stage represented at block 206, the output of which is directed to line 208. Control over the sample switching function at block 206 is represented at line 210 as extending from the microprocessor control represented at block 166.

Line 208 carrying the d.c. level corresponding to a given coordinate value is directed to an analog-to-digital conversion function represented generally at 212 which is constituted by an operational amplifier stage 214, a comparator stage 216 and a digital-to-analog converter 218. It may be observed that line 208 carrying the noted d.c. level extends through input resistor R3 to the inverting input of amplifier stage 214. The output of that stage at line 220 is directed to one input of the comparator stage 216. A feedback path incorporating line 222 and resistor R4 is shown extending about the amplification stage 214, while the non-inverting input thereof is shown coupled to ground via line 224. The positive input terminal of comparator 216 is coupled to ground via line 226, while the output thereof at line 228 is shown directed to an input to the microprocessor control 166. That same microprocessor control extends a controlling input to digital-to-analog converter 218 via line 230 such that a d.c. level output is provided from stage 218 at line 232 which is directed through resistor R5 to a summing point represented at 234. A digital value for d.c. level at line 208 thus is evolved by incrementing the output of converter 218 until such time as the d.c. signal at line 232 as presented to point 234 from resistor R4 nullifies the d.c. level at line 208. With the achievement of nullity, the output at line 228 is at a zero or reference level and the microprocessor control 166 then accepts the digital value of the input at line 230 as the digitized information desired. Generally, a positive output will be seen provided at line 232, while an output of opposite polarity is provided at line 208.

The system as thus described, requiring four measurements per coordinate pair generation, i.e. two measurements in the x direction and two measurements in the y direction has been found to be quite adequate in terms of speed of such information development. However, the rate of coordinate pair generation can be increased by the expedient of halving the number of such measurements required. To carry this out, a second frequency may be introduced into the system. Thus, instead of driving one side of the resistive layer at the given excitation voltage source and the other at ground, one coordinate side may be driven at one frequency and the other side at another frequency. This generates two voltage potentials across the tablet for the given coordinate direction. In this regard, if a frequency, f1, is applied to, for example the right-hand side of the tablet 30, and a next frequency, f2, is applied to the left-hand side in the x-coordinate direction, the frequencies will 'see' a virtual ground at the opposite coordinate side and generally oppositely ramping voltages will be developed simultaneously across the tablet in a given elected coordinate direction. Thus, two measurements may be carried out in one time cycle to evolve a high coordinate informational rate which, essentially, is limited only by the settlement time in the analog circuitry. With the dual frequency arrangement, for example, a coordinate pair generation rate of 200 pairs per second developed with a single frequency system may be boosted to 300 coordinate pairs per second. For this alternate approach, an alternate or second a.c. excitation ssource is represented in FIG. 6 at 240 shown connected via dashed line 242 to ground and via dashed line 244 to line 152. Thus, this second frequency, f2, may be applied via line 152, while a different frequency, f1, may be applied in the manner described in conjunction with source 136. The resultant dual frequency output then is applied through amplification stage 184 to output line 186 and, simultaneously, to line 246 so as to be directed to both frequency selection circuit 190 and an identical circuit represented within dashed boundary 248 which incorporates a tank circuit as at 196 tuned to frequency f2. The output of this selection circuit then is directed via line 250 to line 208 for analog-to-digital conversion represented at stage 212. Switching contorls provide for the selection of output.

Figure 7:
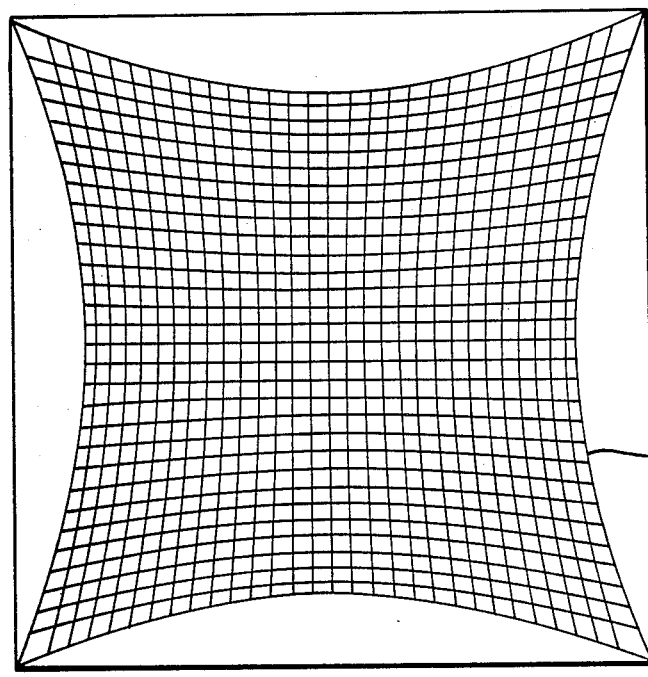
FIGS. 7 through 10 are computer model representations of the read-out for an electrographic device having a ratio of conductivity of a conduction band according to the invention to the resistive layer region of 25:1 and wherein the values of discrete resistance elements are varied to achieve a linear response.
Figure 8:
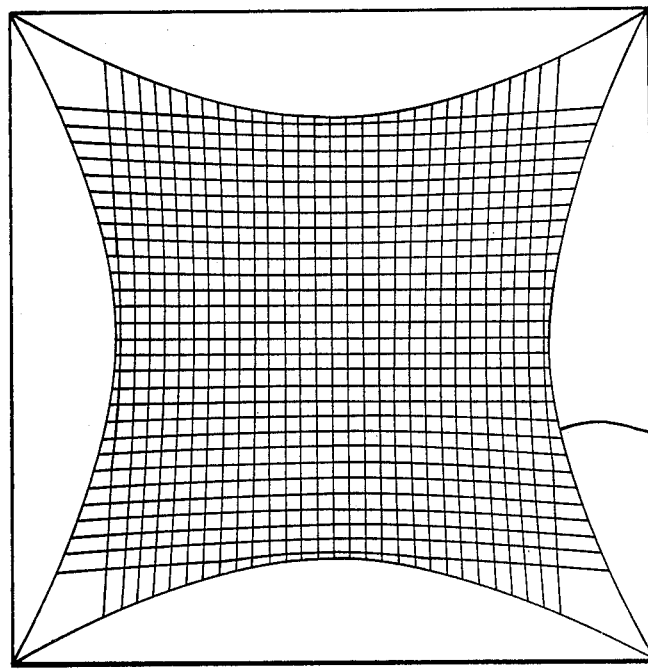
Figure 9:
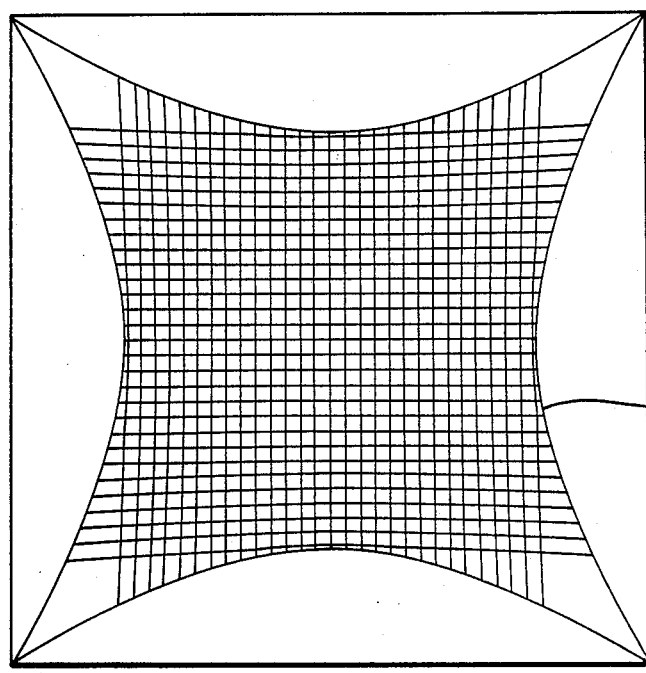
Figure 10:
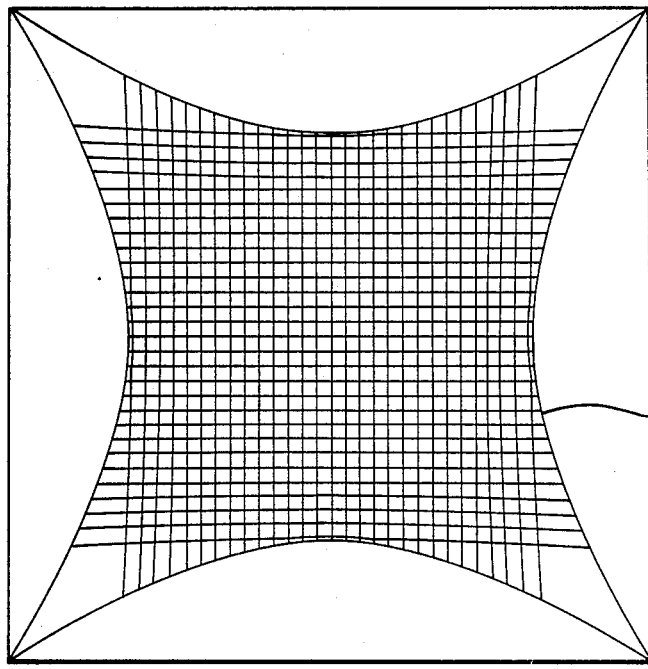
Figure 11:
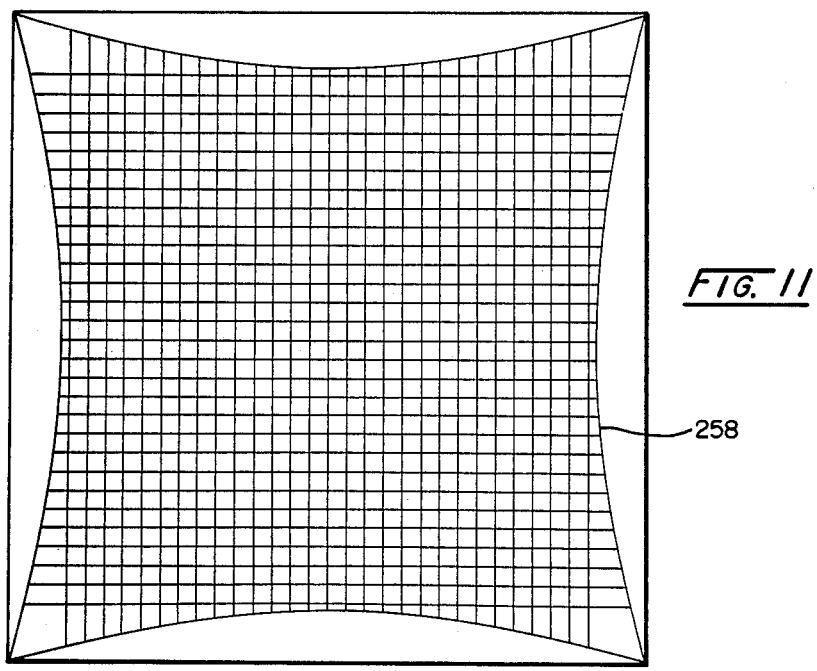
FIG. 11 is a computer modeled readout develped as with the readouts of FIGS. 7-10 but having a conduction band to resistance layer region conductivity ratio of 50:1.

For the four corner driving or accessing technique of the electrographic technology at hand to be practical, it is necessary that the performing linearity of the resistive layer be adequate. That is, the voltage gradients developed across the resistive surface during excitation should be as distortion free as possible. This subject is discussed in detail in the above noted U.S. Pat. No. 4,649,232 incorporated herein by reference. With the instant invention, this development of linearity within resistive the region itself is achieved through utilization of the noted conduction bands and the discrete resistors or resistance elements extending therefrom to the patterned resistive layer. Without these features, the output or voltage gradient performance of the resistive layer for any given locator or stylus positioning will be quite distorted and unacceptable. Generally, the resistive layer will exhibit a selected resistivity as above discussed and also will exhibit a corresponding conductivity. The use of a conduction band as discussed in conjunction with FIG. 4 and exemplified at 72 and 92 in FIG. 5 considerably improves tablet or resistive layer performance. To practically provide a conduction band, it is highly desirable for production purposes that it be formed of the same material as a resistive layer, i.e. ITO and that as high a ratio of conductance between the two components be developed as is practical from an electrical performance standpiont. However, it also is desirable that the amount of resistive layer material between the operational area and the conductive band be minimized and that the area of substrate taken by the conduction band be minimized. Thus, the shorting bar techniques described in conjunction with FIGS. 4 and 5 are employed to enhance the value of conductivity of the conductivity bands while minimizing the substrate required adjacent the active resistance layer region. Generally, a ratio of 10:1 of the conductivity values of the band versus the resistive layer is necessary, values for example of 25:1 showing considerable improvement over the former. Looking to FIGS. 7–10, computer plots are illustrated representing relative distortion voltage gradient grids where a noted conductivity band to resistance layer conductivity ratio of 25:1 is provided. The computer modeled plots shown in the noted figures correspond with those which will result from positioning a locator or stylus in regular increments across the active area of a tablet for the noted geometry. However, the resistance values for the discrete resistance elements as described at 100–109 and 112–131 in FIG. 5 are varied from plot-to-plot to achieve optimization. FIG. 7 shows a first iteration at the noted ratio. The resultant output grid as represented generally at 250 shows a considerable amount of distortion about the periphery of the readout. Grid linearity only is achieved in the central portion of the grid 250. In FIG. 8, the values of the discrete resistances are varied such that a grid 252 is developed in which linearity or squareness is achieved for a larger portion of the grid. In FIG. 9, such linearity of grid 254 again is improved as well as at 256 in FIG. 10. However, it may be noted that the active or useable area of the grid is somewhat severaly displaced from the border or boundary regions. FIG. 11 illustrates the effect of increasing the ratio of conductivity of the conduction band to that of the resistive layer to 50:1. Note that the bow distortion about the periphery of the grid 258 has been significantly reduced with this larger ratio to improve boundary utilization. Additionally, the discrete resistive elements have been selected so as to exhibit a uniform impendance to the corner located driving terminals and the variation in values of the resistance elements were provided as symmetrical about the half-way points between terminals. By employing the noted conduction band and discrete resistive elements array, an adequate linearity may be achieved even though only the four corners of the rectangular resistive layer are driven as described above. By incorporating the above electrographic technology in conjunction with the corrective procedure as described by Nakamura et al. in U.S. Pat. No. 4,650,926, very high and desirable resolution and accuracy for an electrographic device can be achieved. U.S. Pat. No. 4,650,926 is incorporated herein by reference.

Figure 12:
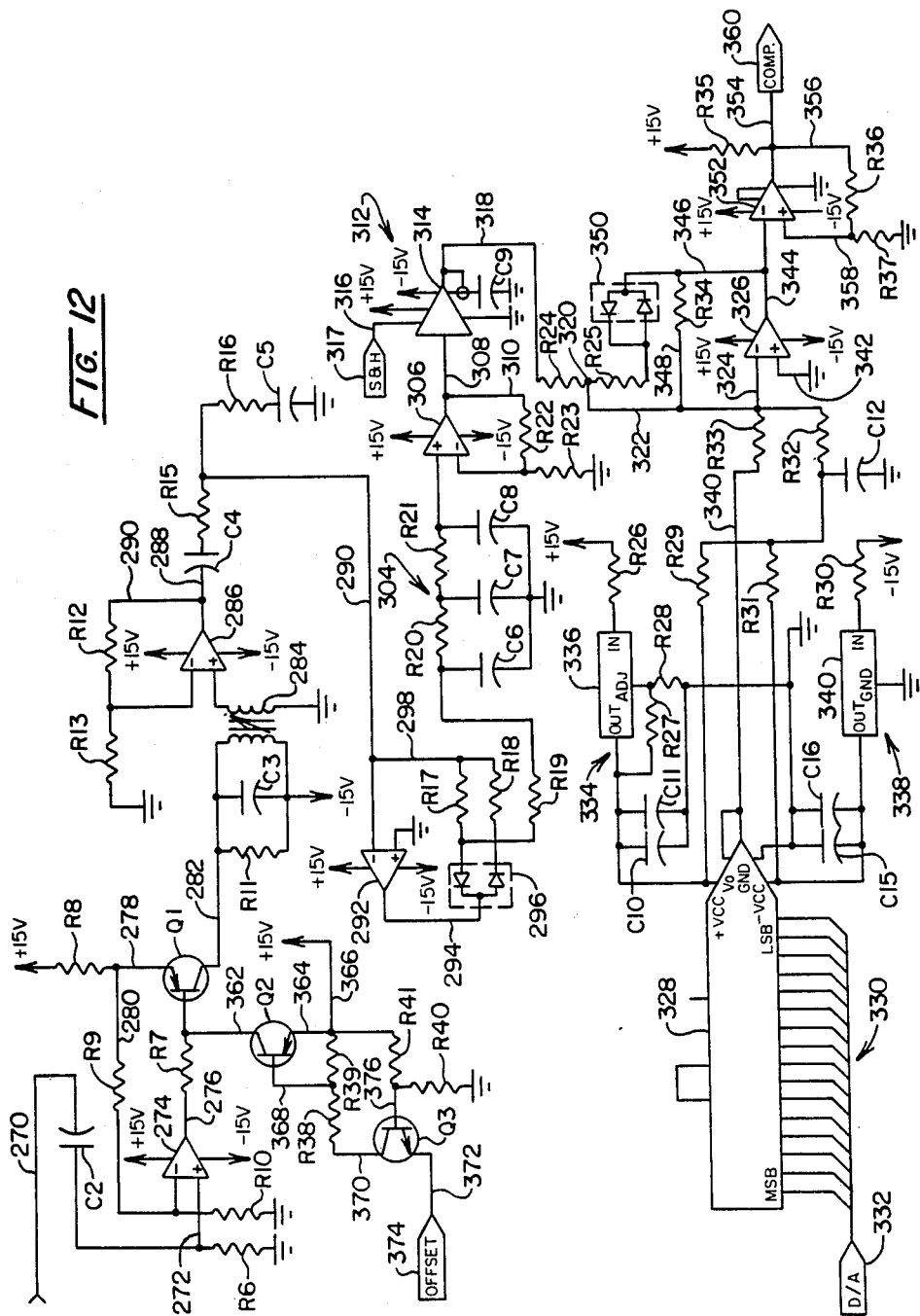
FIG. 12 is an electrical schematic diagram showing analog treatment of digitizer derived signals.

Referring to FIG. 12, a more detailed schematic representation of the circuitry by which the digitizer technology of the invention may be implemented is revealed. The output of cable 182 as described in conjuction with FIG. 6 is as coupled to locator or stylus 134 is connectable to an input line 270. Line 270, in turn, is shown coupled through coupling capacitor C2 and line 272 to the positive terminal of a buffer stage 274. A resistor R6 is shown coupled to ground for purpose of dissipating the d.c. component present at line 270 as blocked by capacitor C2. The latter capacitor functions in the presence of an active locator or stylus 134 which incorporates a pre-amplification stage as discussed above. The output of buffer stage 274 at line 276 is directed through base resistor R7 to the base electrode of PNP transistor Q1. Buffer stage 274 may be provided, for example, as a type LF357. The emitter of transistor Q1 is coupled via line 278 and resistor R8 to +15v supply and, additionally, is coupled to a feedback path for stage 274 including line 280 and defining resistors R9 and R10.

Transistor Q1 represents a current source in the noted feedback lkoop of stage 274 such that the current entering the emitter thereof is proportioned with respect to resistor R8. The current flow from the collector of transistor Q1 at line 282 is directed to a tank circuit formed of resistor R11, capacitor C3, and transformer 284. The relatively high Q of an LC tank circuit as thus presented is controlled in terms of settling time by resistor R11. A transformer as at 284 is employed in view of the −15V supply at hand and the output of the circuits is presented to the non-inverting input of a buffer amplifier 286. Amplifier 286 may, for example, be a type LF356 and the output thereof at line 288 is seen to incorporate a feedback path including line 290 and gain defining resistors R12 and R13. (Buffer stage 274 may be provided, for example, as a type LF357). To assure the elimination of any d.c. component from the signal input, an a.c. coupling comprised of capacitors C4 and C5 as well as resistors R15 and R16 is provided within output line 288. The thus-treated signal at line 288 then is directed via line 290 to the input of a half wave rectifier network including a type LF357 operational amplifier stage 292, the output of which at line 294 is directed to a rectifying diode pair represented within dashed boundary 296. The oppositely connected diodes at boundary 296 are coupled, in turn, via resistors R17 and R18 and line 298 to line 290 and the output of the arrangement at resistor R17 is tapped by line 302 incorporating resistor R19 for presentation to a three-pole filter network represented generally at 304 and comprised of capacitors C6, C7, and C8 performing in conjunction with resistors R20 and R21. With the arrangement shown, at capacitor C8 a d.c. compknent is witnessed exhibiting a level proportional to the a.c. input at line 270. This d.c. level is asserted to the non-inverting input of a type LF356 operational amplifier 306 which provides an output at line 308 and exhibits a gain defined by the feedback path incorporating lilne 310 and gain defining resistors R22 and R23. Stage 306 functions as a buffer to a sample and hold network represented generally at 312 which is comprised of a type LF398 operational amplifier 314 and capacitor C9. Stage 314 is activated from the microprocessor control via line 316 and functions in the logic control of the system to set-up appropriate switching, sampled resultant signals, and start the analog-to-digital convertion process. As the latter converion process ensues, the switches are changed for altering the drive signal in the sequence of switching described above. This permits a settling time for the a.c.-to-d.c. converter function to be optimized, it being desirable to minimize 'dead time' within the analog system of the control circuitry. The output of sample and hold network 312 is provided at line 318 and is directed to a summing point 320 positioned intermediate resistors R24 and R25. The latter summing point is seen coupled via line 322 and 324 to the inverting input of a summing amplifier 326 which may, for example, be provided as a type LF357 operational amplifier. Gain of the input signal is developed by the noted resistors R24 and R25. The output at line 322 is summed with the corresponding output of a digital-to-analog converter 328 which may, for example, be provided as a type PCM 5. This converter is controlled digitally from the microprocessor control via line array 330 shown connected to a bus connector 332. Sixteen-bit converter 328 performs in conjunction with a lower voltage level, i.e. ±5v, thus a conversion is provided by network 334 including a voltage adjustment circuit 336 which is coupled to +15v through resistor R26. The supply input associated with network 334 is filtered by capacitors as at C10 and C22 and is further regulated via resistors R27, R28, and R29 as well as capacitor C12. In similar fashion, a network 338, incorporating a voltage converter 340 is shown coupled to −15v supply through resistor R30 and the supply further is filtered by capacitor C15 and C16 as well as resistors R31 and R32. Converting device 336 may be provided, for example, as a type LM317LZ, while device 340 may be provided as a type LM79LO5ACM.

The d.c. output of converter 328 is provided at line 340 and is directed through resistor R33 to the line 324 summing input to summing amplifier 326. Resistors R33 and R25 define the gain of the output of converter 328. The opposite input to stage 326 is coupled to ground via line 342 and the output thereof is seen provided at line 344. The gain of stage 326 is established in conjunction with two feedback paths which are signal level responsive. (R33 and R25 define the gain of the output of converter 328). One of the feedback paths of stage 326 is developed in conjunction with line 346, line 348, and resistor R34. The next feedback path is defined by line 346, diode pair 350, and resistor R25. With the arrangement shown, in the presence of very low level signals, resistor R34 represents a determination of gain, inasmuch as the ratios between resistors R24 and R34 and R33 and R34 are high such that an enhanced gain is developed. This permits signal discrimination improvement. Where the voltages involved are far apart, it is not necessary to maintain the stage 326 in saturation such that the diode pair 350 conducts and the resultant gain is set by the resistor R25. Accordingly, when the voltages at the summing input at line 324 commence to approach and nullify each other, the feedback path essentially is through resistor R34.

Output line 344 is directed to one input of a comparator 352 having an output at line 354. Line 354 is coupled through pull-up resistor R35 to +5v and the stage is configured having a feedback path including lines 356 and 358 along with resistors R36 and R37. The resultant output at line 354 will have an effective zero value in the presence of coincidence between the output of the converter stage 328 and the incoming d.c. signal. As represented at connector 360, this output is directed to the microprocessor control function. The digitizing technique is one of successive approximation wherein the most significant bit of device 328 initially is activated and a greater-than or less-than comparison is made for evaluation at the computer stage. Upon coincidence of values and an effective zero output at connector 360, the digital input to comparator 328 is read as the digitized valuation.

The microprocessor driven control of the system also includes an offset measurement feature wherein any d.c. phenomena within the signal treatment or analog portion of the circuit is evaluated through the expedient of turning off the current supply as developed at transistor Q1 and then evaluating for such a d.c. term. Transistor Q1 is turned off by a PNP switching transistor Q2, the collector of which is coupled via line 362 to line 276 and base of transistor Q1. The emitter of transistor Q2 is coupled via line 364 and line 366 to +15v, while the base thereof is coupled via line 368 to line 370. The latter connection is seen to be positioned between resistors R38 and R39. When transistor Q2 is turned on, the base of transistor Q1 is caused to assume a high or +15v condition to switch or clamp transistor Q1 off. Transistor Q2, in turn, is controlled from NPN transistor Q3 the collector of which is coupled to line 370 and the emitter of which is coupled via line 372 to connector 374 representing an offset input from the microprocessor control. The base of transistor Q3 is coupled via line 376 and resistor R40 to ground as well as through resistor R41 to line 364. With the arrangement, the base of transistor Q2 is at a voltage determined by resistors R40 and R41 providing a positive bias. Where the input at connector 374 brings the emitter to a logic low at line 372, transistor Q3 will turn on to pull the base of transistor Q2 low causing it to conduct to saturation. At the latter condition occurs, transistor Q1 is turned off to cancel current flow to line 282. Under these conditions, the microprocessor may then evaluate the d.c. levels within the analog circuitry.

Figure 13:
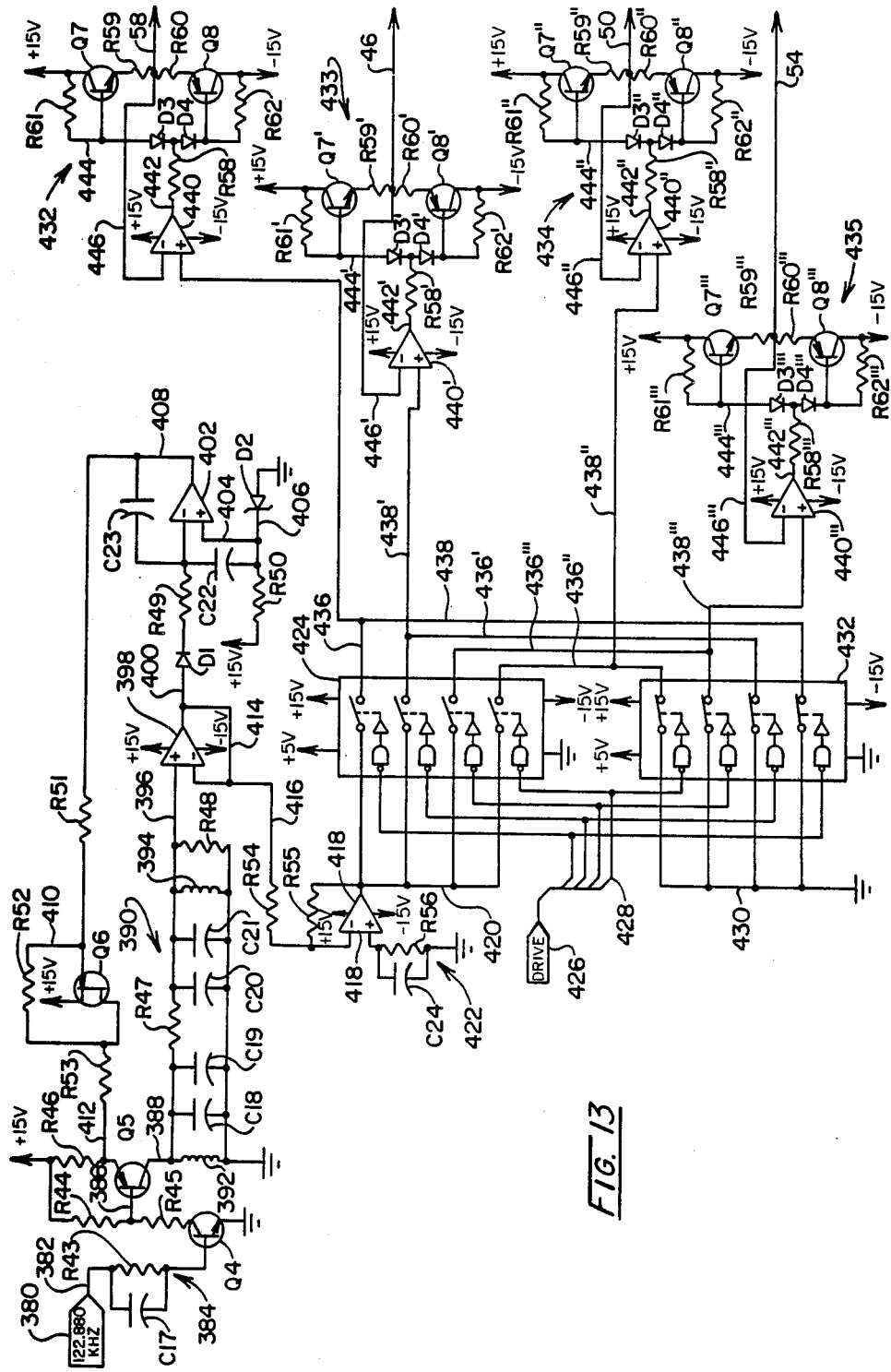
FIG. 13 is an electrical schematic diagram showing the development and distribution of excitation signals used with the electrographic device of the invention.

Referring to FIG. 13, the a.c. excitation source or drive for application to the electrographic device is portrayed. In its general performance, a 122.88 KHz signal is derived from the microprocessor control function and introduced as represented at connector 380. The resultant a.c. sinewave is directed via line 382 through a stabilization network 384 comprised of capacitor C17 and resistor R43 to the base of NPN transistor Q4. The emitter of transistor Q4 is coupled to ground, while the collector thereof is coupled through resistor R44 and R445 to +15v. A line 386 is connected from the midpoint of the latter resistors to the base of PNP transistor Q5, the emitter of which is coupled to +15v through resistor R46. Transistor Q5 functions as a current source which is turned on and off by transistor Q4. The resultant a.c. current output from transistor Q5 at line 388 is directed to a two-stage tank, L-C circuit represented generally at 390 and shown to be formed of inductor 392 along with capacitors C18, C19, and resistor R47. A second stage of the filter 390 is comprised of capacitors C20 and C21 performing in conjunction with inductor 394 and resistor R48. The output of tank circuit 390 at lines 396 is buffered at operational amplifier stage 398, the output of which at line 400 extends through diode D1 and resistor R49 to the input of a rectifier stage 402. Buffer 398 and stage 402 may be provided, for example, as type LF353 operational amplifiers. Rectifier stage 402 is so configured by virtue of the connection of its non-inverting input via line 404 to line 406 incorporating a diode D2 and resistor R50. Stabilizing capacitors additionally are provided about the stage 402 as repsresented at C22 and C23. The output of stage 402 at line 408 is a d.c. signal which is directed through resistor R51 to provide an automatic gain control (AGC) function. In this regard, line 408 is seen directed to the gate of an FET transistor Q6 which is employed as a voltage controlled resistor which is located in parllel with the emitter resistor of transistor Q6 which, in turn, provides current to the tank network 390. In this regard, note that a by-pass resistor R52 is positioned about transistor Q5 within line 410 and thence is directed through resistor R53 and line 412 as noted above to the emitter of transistor Q6. The output of the filter network 390 at lines 414 and 416 is a controlled a.c. signal which is directed through resistor R54 to an next buffer stage 418 having an output at distribution line 420. A feedback resistor R55 is coupled between line 420 and input line 416, while a stabilizing network 422 comprised of capacitor C24 and resistor R56 is coupled to the non-inverting input of the stage 14 which, in turn, may be provided as a type LF356 operational amplifier. Line 420 carrying the a.c. output is directed to the input of four binary switches contained with a package thereof represented within block 424. Each of the discrete switches within block 424 is controlled from the microprocessor function as represented by the 'drive' connector 426 and the four line array 428 control associated therewith. In similar fashion, a ground is asserted from line 430 to the input of four switches contained within a four switch package thereof 432. The latter switches are simultaneously controlled from the four line array 428. Switch 424 package may be provided, for example, as a type DG 211 while switch package 432 may be provided as a type DG 212. These switch groupings 424 and 432 operate in parallel pairs in a fashion such that one control input from array 428 controls two switch componentss, one component opening and its mutually paired component closing. The outputs from the paired switches extend to four driver networks represented generally at 432–435 and the outputs of these driver networks are directed to respective leads 58, 46, 50 and 54 as described in conjunction with FIG. 4. Inasmuch as each of the networks 432–435 is identical, that at 432 is described herein and the components of circuits 433–435 are shown with the same numeration in successional primed fashion. Network 432 is shown receiving a switched output from lines 436 and 438, the latter of which is directed to the non-inverting input of an operational amplifier 440. The output of amplifier 440 at the line 442 is directed through resistor R58 to line 444 at a point intermediate diodes D3 and D4. Line 444 is seen to be in single transfer relationship with the bases of NPN transistor Q7 and PNP transistor Q8 having a common emitter connection through resistors R59 and R60. The junction between resistors R59 and R60 is coupled with line 446 in feedback fashion to the inverting input of amplifier 440. Resistors as at R61 and R62 couple the collectors of transistors Q7 and Q8 to line 444 and the transistors Q7 and Q8 are seen to be coupled at their collectors with respective +15v and −15v supply. With the push-pull arrangement thus shown, a relatively noise immune output may be provided of desirable consistnecy at the outputs of the driver circuits. Diodes D3 and D4 provide for assured operation near the cross-over point of the sinusoidal a.c. output of the drivers during that mode of their operation. It may be observed that the driver networks 432–435 also function to isolate the switches within groupings 424 and 432 from the resistive layer of the electrographic device.

Figure 14B:
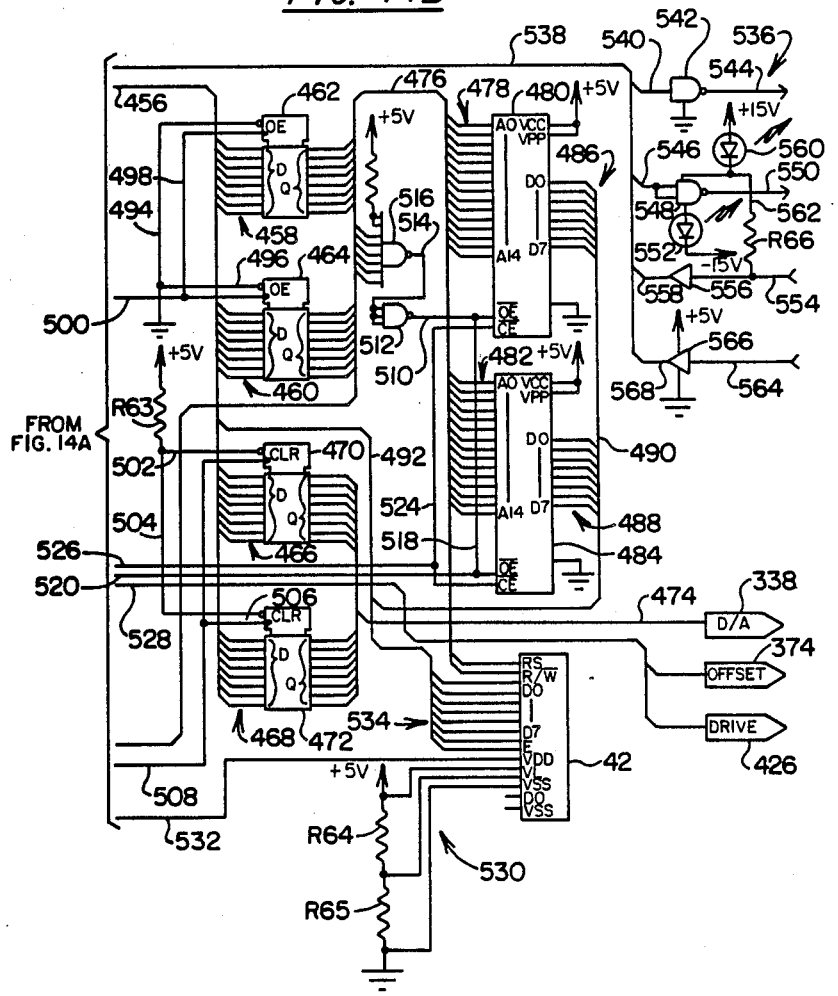

Referring to FIG. 14A and 14B which are mutually associated in accordance with the labeling provided thereon, the microprocessor driven control features of the invention are portrayed. FIG. 14A shows a microprocessor 1450 which may, for example, be provided as a type 8092 marketed by Intel Corporation. This 16-bit device incorporates a universal asynchronous receiver-transmission (UART) function and is seen receiving a 7.3728 MHz clock input at its XTL1 and XTL2 input terminals from a crystal 452 associated with capacitors C26 and C27. A 16-line array 454 is seen emanating from the P3.0-P4.7 ports of device 450 which evolves as a bus 456 which is directed through eight-line arrays 458 and 460 (FIG. 14B0 to respective address latches 462 and 464. Additionally, bus 456 is seen to be connected through eight-line arrays to respective latches 470 and 472. Latches 462, 464, 470 and 462 may be provided, for example, as type 74HCT373. The outputs of latches 470 and 472 are combined into a 16-bit bus as at 474 for controlling input to the digital-to-analog converter 328 (FIG. 12) as represented by earlier-described connector 332 which was reproduced in FIG. 14B. The outputs of corresponding latches 462 and 464 are directed to a 16-bit bus 476 which, in turn, extends to the A0-A14 inputs of an EPROM memory 480 as well as through array 482 to an identical EPROM memory 484. Memories 480 and 484 may be provided, for example, as a type 27C256. The D0-D7 terminals of memories 480 and 484, respectively, are coupled through lines arrays 486 and 488 to bus 490 which extends through bus linkage 492 to earlier-described bus 456.

The output enable (OE) terminals of address latches 462 and 464 are coupled to ground via lines 494 and 496, while their enablement is provided from lines 498 and 500, the latter extending to the ALE terminal of microprocessor 450 as seen in FIG. 14A. Similarly, the clear (CLR) terminals of latches 470 and 472 are coupled to +15v via lines 502 and 504, the latter being coupled through resistor R63 to +5v. These latches additionally are enabled from lines 506 and 508.

The output enablement terminal (OE) of memory 480 is activated from line 510 which extends as the output of address decoder three input NO gate 512, the common inputs of which, in turn, are derived from line 514 and address decoder NAND gate 516, the inputs of which are coupled both to +5v and bus 476. Line 510 additionally is coupled to lines 518 and 520 which extends to the inputs of a chip selection logic network shown in FIG. 14A at 522. The chip select (CE) terminals of memories 480 and 484 are commonly enabled from lines 524 and 526, the latter line extending to the write (WR) port of microprocessor 450. The bus next adjacent to line 520 at 528 is seen to extend from the HSO, P1.5-P1.7 terminals of microprocessor 450 to the earlier-described offset connector 374 (FIG. 12) as well as the switch drive connector described in FIG. 13 at 426 and carrying the same numeration in FIG. 14B. The LCD display described in connection with FIG. 442 again is reproduced in FIG. 14B. VDD, VL and VSS terminals of the device are coupled via three-line array to +5v as modified by serial resistors R64 and R65. An enable output of device 42 is coupled to line 532 representing one output of selection network 522, while the data terminals D0-D7 are coupled to earlier-described bus component 492 via line array 534. The RS and read/write (R/W) terminals of device 42 are seen coupled to bus 476. FIG. 14B also reveals the presence of RS232 communications components in general at 536. These components are in communcation with the microprocessor 450 via bus 538 which extends to the P2.0, P2.1, P2.6, and P2.7 terminals thereof. One lead from bus 538 at 540 extends through gate 542 to provide a transmit output at line 544. Similarly, a ready-to-send (RTS) output is provided from lead 546, gate 548, and line 550. The light-emitting diode (LED) 552 may be illuminated in the presence of an activation of gate 548. In similar fashion, a clear-to-send (CTS) input to the microprocessor 450 may be provided from line 554, gate 556, and line 558 to bus 538. Simultaneously with the position of the signal at line 554, an LED 560 may be energized from line 562 and resistor R66. Finally, a received transmission may be provided at line 564 which extends through gate 566 and line 568 to bus 538.

Returning to FIG. 14A, the output of the comparator represented at connector 360 (FIG. 12) again is represented by the same numeration as extending via line 570 to the P0.5 terminal of device 450. Similarly, the sample and hold connector as described 317 again reproduced and is seen being coupled via line 572 to the P1.1 terminal of device 450.

A non-volatile RAM 574 is provided which may be, for example, a type S2444 and serves the function of retaining set-up instructions utilized by the user to configure the digitizer tablet as at 30. Memory 574 is shown connected to the P1.4, P1.3, P0.6 and P1.2 terminals of microprocessor 450. In essence, device 574 provides the permanence of switching components as earlier were employed with digitizer tablets as an adjunct to the convenience of the menu programmed configuration technique of the invention.

The read (RD) and write (WR) terminals of microprocessor 450 are seen to be connected via lines 576 and 578 to the respective clear and clock terminals of a wait state generator 580 which performs a concert with a similar device 582, both components being present, for example, as type 74HCT393 devices. The Q1 output of device 582 is seen coupled through gate 584 and line 586 to the clear terminal of device 580, while the clock input of device 582 is coupled via line 588 to network 522. One output of the latter network at line 532 is seen to extend to the E terminal of display 42 and the arrangement shown provides a persistence of display inasmuch as LCDs as may be employed are relatively slow devices and a read or write wait state is required for their appropriate operation.

Push-button input from a tracer, for example as described in U.S. Pat. No. 4,707,572 by Kable, et al. incorporated herein by reference may be coupled via five-line array 590 to the P0.0-P0.4 terminals of microprocessor 450. The discrete lines within the array 590 are coupled through pull-up resistors shown arrayed at 592 to +5v and a corresponding array of stablizing capacitors is shown at 594.

The clock output of microprocessor 450 at line 578 is tapped by line 596 for submittal to cascaded counters 598 and 560. These counters are configured to develop a 122.8 KHz output which is directed via line 602 to the earlier connectors 380 described in conjunction with FIG. 13 and reproduced with the same numeration herein. sehe tracer or stylus which may be employed with the electrographic device preferably will incorporate a light-emitting diode (LED) which will apprise the operator that coordinate pair measurements are being made and data are being returned into the control system. Such an LED is driven from the P1.0 port of device 450 as repesented by line 604 incorporating a pull-up resistor R67 coupled to +5v and extending through pull-up resistors R68 to the base of NPN transistor Q10. The emitter of transistor Q10 is coupled to ground, while the collector thereof is coupled via line 606 incorporating Zenner diode D5 and resistor R69 to line 608 coupled, in turn, to the collector of NPN transistor Q11. The base of transistor Q11 is coupled to line 606 intermediate diode D5 and resistor R69, while the emitter thereof functions as an LED drive at line 610 to the noted LED. Line 610 is seen to incorporate resistor R70.

Figure 15A:
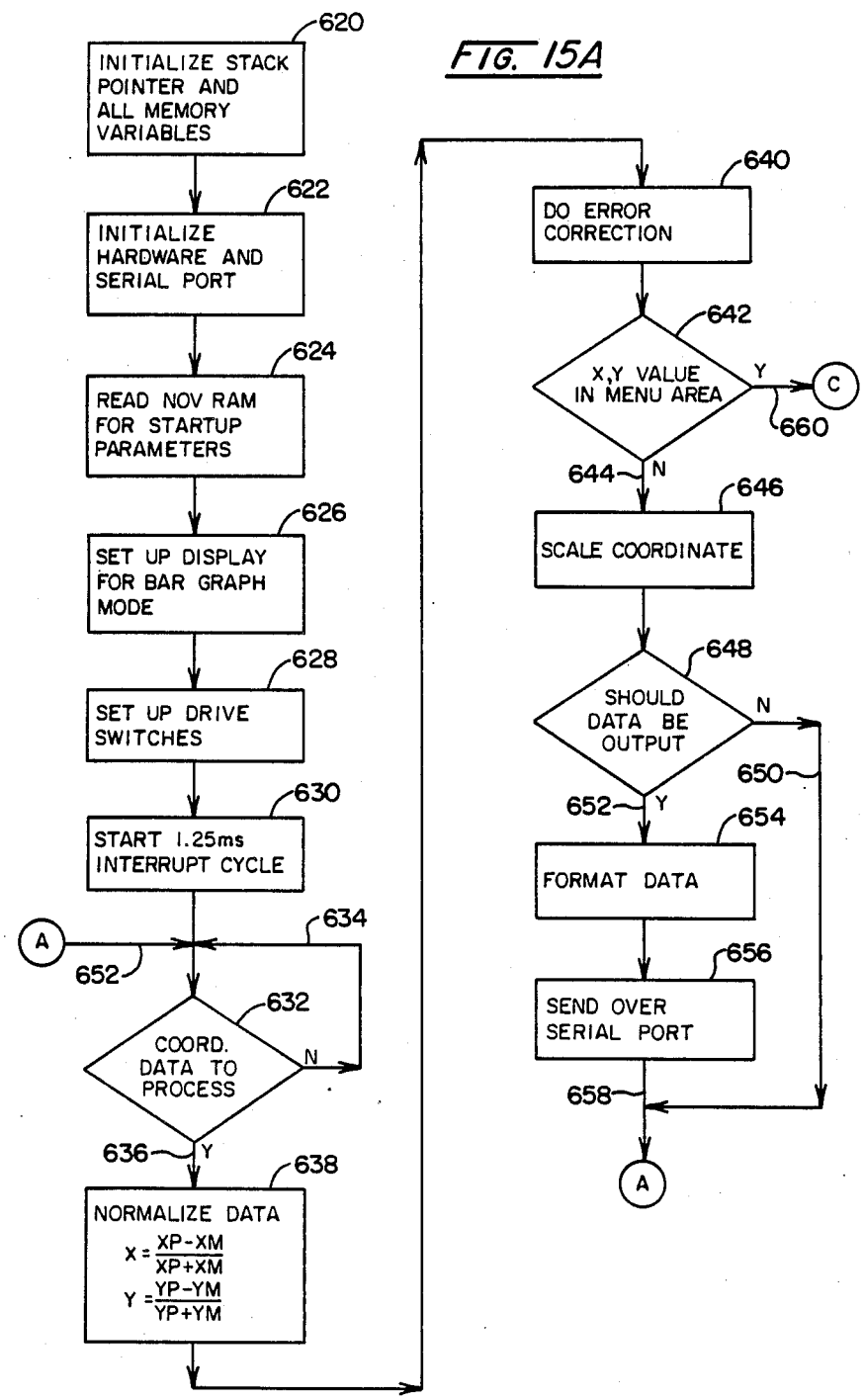
FIGS. 15A-15C constitute a flow chart describing the main control program of the apparatus of the invention.

Referring to FIG. 15A, a first component of a generalized main control program under which device 450 performs is set forth in flow chart fashion. This program commences as represented at block 620 with an initialization of stack pointers and an initialization of and, in effect, clearing out of memory retained variables. The program then proceeds as represented at block 622 to carry out the intialization of the all hardware components including such elements as serial ports and the like. Next, as represented at block 624, the operating or configuration parameters of the tablet as retained in non-volatile RAM 574 are read. These configurations variable will include Baud rate scaling factors determining whether English or metric units have been elected, the coordinate speed, for example 50 coordinates per second, 100 coordinates per second and the like. Next, the mode of operation may be elected whether its stream mode wherein all data are continuously collected or point mode wherein data are collected at the depression of a locator retained push-button or the like. Next, an emulation election as to the particular form or manufacturer configuration of the digitizer is selected. Further, a determination is made as to whether the data are recorded in ASCII or binary format.

Next, as represented at block 626, the display 42 is set-up for a bar graph readout which provides a visual feedback that the system is operating, the bar position display representing relevant position of the locator device on the operational surface. The bars, in effect, represent a percent of full scale of position of the locator on the surface of the digitzer device. This form of display is distinguished from the positioning of the locator, tracer, or stylus at a menu area of the working surface typically located near housing 40. Next, as represented at block 628, the drive switches as described at 424 and 432 in FIG. 13 are set-up and, the program then progresses to commence a 1.25 millisecond interrupt cycle as represented at block 630. This is predicated upon a coordinate pair generation rate of 200 per second.

Following the above general initiation procedures, the program then proceeds to the inquiry as represented at block 632 wherein a determination is made as to whether coordinate data are present for processing. In the event they are not, then as represented by loop line 634, the system dwells until such data are present. In the event coordinate date are available, then as represented at line 636 and block 638, the earlier-described sum/difference normalization procedures are carried out. The program then continues as represented at block 640 to carry out error correction of the compiled data. This form of error correction is described in detail in U.S. Pat. No. 4,650,926 (supa). Following error correction, as represented at decision block 642, a determination in made as to whether the locator has been positioned in the menu area of the digitizer tablet. This menu area performs in conjunction with display 42 to carry out the earlier-noted configuration of set-up of the digitizer tablet.

Figures 15B, 15C:
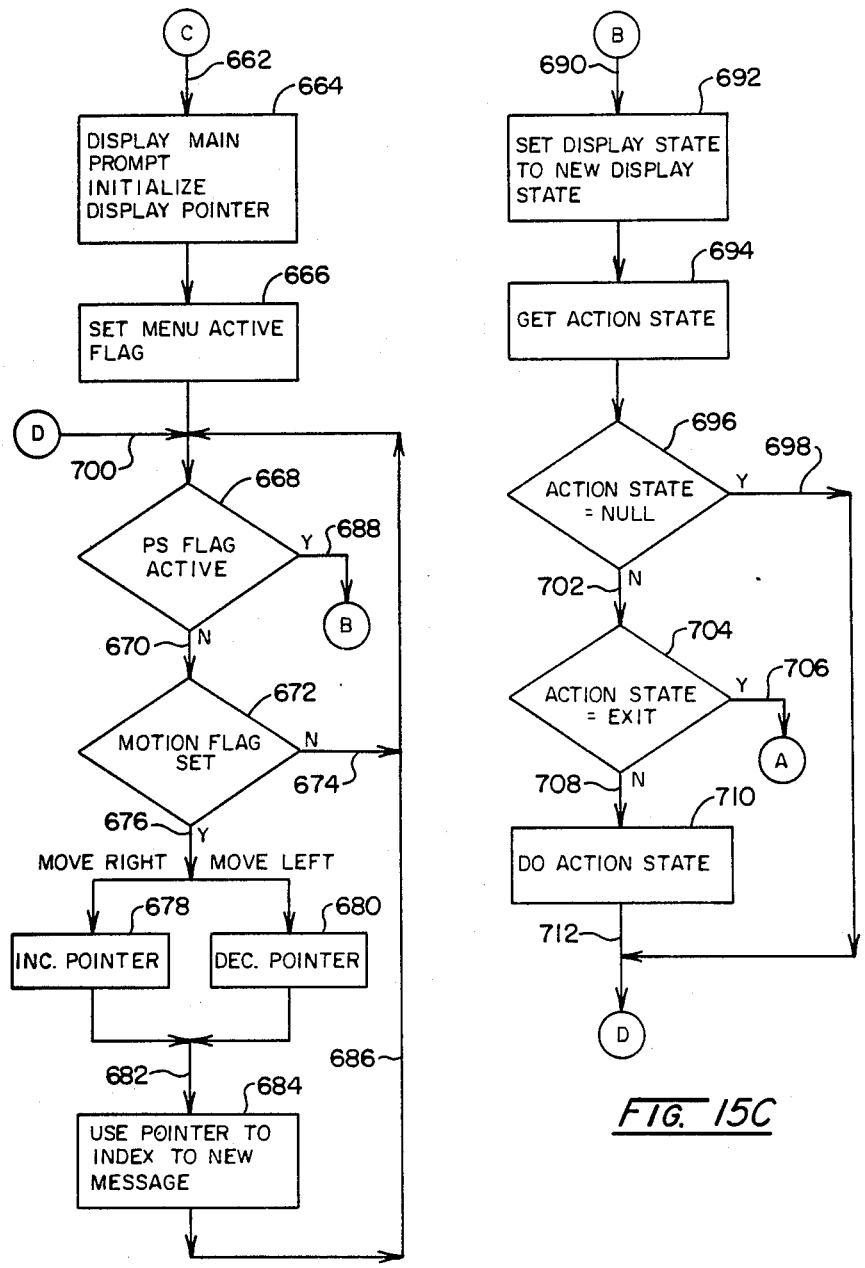

In the event that the locator is not positioned in the noted menu area, then as represented by line 644 and block 646, the data are scaled with respect to English or metric units. Next, as represented at decision block 648, a determinatiion is made as to whether the data should be presented as an output. In the latter regard, a determination is made as to whether stream mode of operation or point mode is present. In the latter condition, the data are not outputted until such time as a cursor or stylus locator button is depressed by the operator. In the event that the data should not be presented as an output, then as represented by line 650 and node A, the program returns to line 652 and the resultant inquiry as to whether data are present as earlier-described in conjunction with inquiry block 632.

Where the inquiry at block 648 is affirmative, then as represented at line 652 and block 654, the data are complied in appropriate format, i.e. ASCII or binary and the program progresses to the instructions at block 656 wherein the data are sent over a serial output port to an associated computer. The program then continues as represented at line 658 and node A to the earlier-described line 652 and inquiry block 632.

Where the determination at block 642 is the affirmative indicating that the locator is within the menu area, then as represented at line 660 and node C, the program proceeds as represented at corresponding line 662 and node C in FIG. 15B. Line 662 as shown directed to the instructions at block 664. Generally, the menu area can be constitued as a small square outside of the working area represented at boundary 64 but inside of the conduction bands and adjacent the housing 40 (see FIG. 4). The instructions at block 664 provide for the presentation at display 42 of the first prompt which generally will instruct the operator to press a first button located upon the cursor or locator device. This further functions to initialize a display pointer. The program then proceeds as represented at block 666 to set the menu active flag which then permits the operator to move the cursor or locator into the main active area within boundary 64 and move the device in one direction or another to effect the scanning of the configuration menu. This generally is carried out with simple right movement of the cursor upon the resistive layer surface or left movement, i.e. if the movement is to the right and incrementation is up, and if the movement is to the left the incrementation is down in a menu utilization sense.

Figure 16:
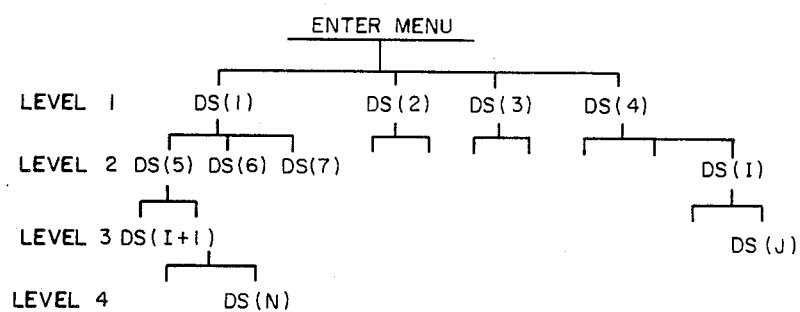
FIG. 16 is a diagrammatic representation of a menu tree structure used with the control program of the invention.

Looking momentarily to FIG. 16, a generalized menu tree structure is portrayed, the menu being entered as shown to achieve a first level in the tree. Items within the level are labelled display state (DS) 1-4 and will incorporate such board level selections as change or the like. The operator moves the cursor or locator to elect one of these level 1 selections and, for example, where it indicates that a change is directed, i.e. at item DS1, then level 2 is accessed and the noted display pointer moves downward in memory in accordance with the selections. At level 2 under the selection of change DS1, it may be observed that items DS5 through DS7 may be elected by cursor or locator movement. Elections have may provide for mode selection, i.e. stream or point, coordinate pair rates and data formatting. The menu structure then may continue as shown at level 3 and item DS (1+7+1) and to further levels as at level 4 and the selection of items as a DS(N).

Returning to FIG. 15B, following the setting of the menu active flag as represented at block 666, the program proceeds to the inquiry at block 668 wherein a determination is made as to whether a push-button on the locator has been depressed or is active. If such button has not been depressed, then as represented at line 670 and inquiry block 672, a determination is made as to whether motion of the locator has occurred within the digitizing region surrounded by boundary 64 since the last button activation. If motion flag is not set, then as represented by loop line 674, the program returns to the inquiry at block 668 to await push-button activity. Where no motion or push-button activations are present, the program may be exited by menu selection of a 'digitize' or 'exit' instruction.

Where the motion flag has been set and the inquiry at block 672 results in an affirmative determination, then as represented at line 676, a determination is made as to whether the motion of the locator is to the right or to the left. Where it is to the right, then as represented at block 678, the display pointer is incremented. Correspondingly, where the motion is to the left, as represented at block 680, the display pointer is decremented. Following such pointer alteration, as represented at line 682 and block 684, the pointer location is used to index to a new message for readout at display 42. The program then loops as represented at line 686 to again await push-button activity as represented at inquiry block 668. In general, with each alteration of the display message, a new sub-routine is accessed to carry out the requisite display state for illustration at display 42 and, a subroutine representing an action state is carried out which reconfigures the microprocessor 450.

Where the inquiry at block 668 is in the affirmative determining that a push-button at the locator has been actuated, then as represented at line 688 and node B the program continues as represented at line 690 and 692 to set the display 42 and the corresponding action state access has no activity associated with it, i.e. it is a null, a form of exit is carried out as represented in line 698 and node D. Node D is seen to re-enter the program as shown in FIG. 15B at line 700 at which point a determination is made as to whether the push-button at the locator has been activated. Where action state is not a null, then as represented at line 702 and block 704 a test is made as to whether the action state is an exit. In the event that it is, then as represented at line 706 and node A, the program returns to line 652 and the entry to a determination as represented at block 632 as to whether coordinate data are available for processing. Where the inquiry at block 704 determines that an exit state is not at hand, then as represented at line 708 and block 710 the selected action state is executed and, as represented at line 712, the program progresses to earlier-described node D represented at line 700 in FIG. 15B wherein the inquiry at block 668 again is carried out.

Figure 17A:
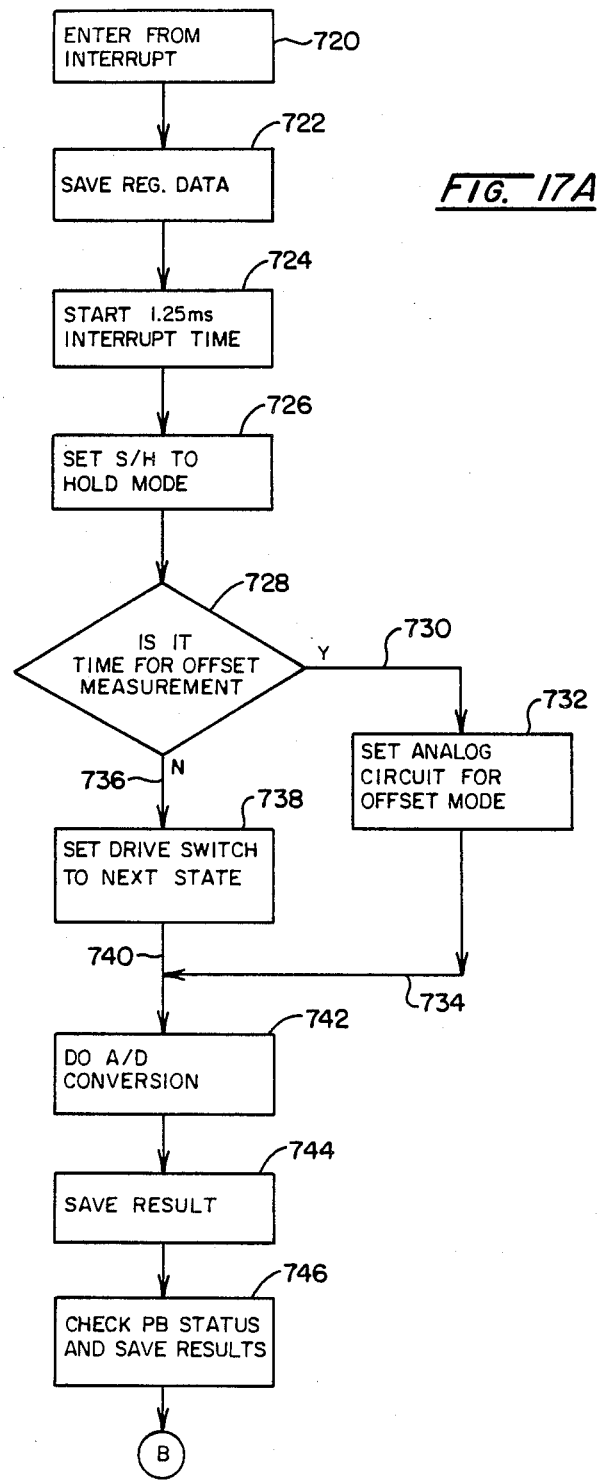
FIGS. 17A and 17B constitute a flow chart describing an interrupt routine employed with the control progam of the invention.
Figure 17B:
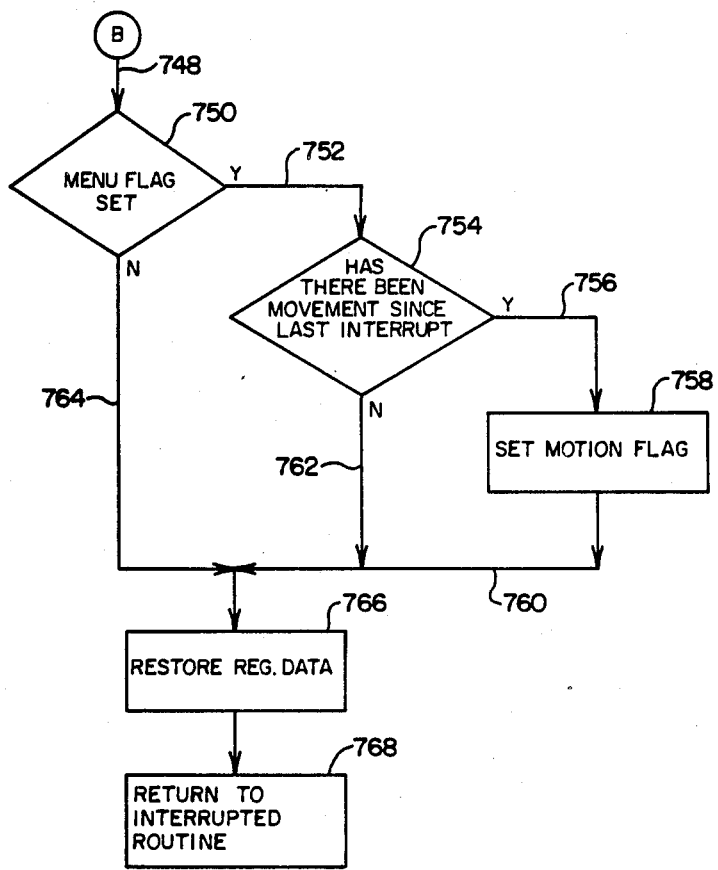

An interrupt program as illustrated in conjunction with FIGS. 17A and 17B operates in parallel with the main program represented by FIGS. 15A–15C. Looking to FIG. 17A, the interrupt routine is shown entering at line 720, such entry, for example, commencing with the start of the 1.25 Mg interrupt cycle as discussed in conjunction with block 630 in FIG. 15A. Line 720 leads to the instructions at block 722 providing for the saving of register retained data during the interrupt interval. The program then continues as represented at block 724 to commence the 1.25 Mg interrupt timing and, as represented at block 726, the sample and hold circuit is set at the hold mode as represented at connector 317. The program then proceeds to the inquiry represented at block 728 wherein a determination is made as to whether it is time to carry out an offset measurement. The offset measurements are carried out, for example, once every 64,000 cycles. In the event such time is at hand, as represented at line 730 and block 732, the analog circuit is set for the offset mode with appropriate inputs through connector 374(FIG. 12). The program then proceeds as represented at line 734. Where the inquiry at block 728 determines that the time is not appropriate for an offset measurement, then as represented at line 736 and block 738, the drive switches are set for the next state or next mode of measurement. The program then continues as represented at line 740 and block 742 to carry out an analog-to-digital conversion. Results of this conversion are saved a represented at block 744 and the results of any push-button status are checked and saved. The program then continues as represented at node A andline 748 in FIG. 17B. Line 748 leads to the inquiry at block 750 determining whether the menu flag has been sent by vitue of the earlier discussed movement of the locator or tracer to the menu block at the resistive surface. Where the menu flag has been sent, then as represented at line 752 and block 754 a determination is made as to whether there has been movement since last intyerrupt. In the event that there has, then as represented at line 756 and block 758, a motion flag is set and the program continues as represented at line 760 and 762. Where there has been no movement of the locator as determined by the inquiry at block 754, the program continues as represented at line 762. Where a negative determination is made in conjunction with the querry at block 750 and the menu flag is not set, then the register data are restored as set forth in the instructions at block 766, and as represented at block 768, the main routine from which the interrupt occurred is re-accessed.

Figure 18:
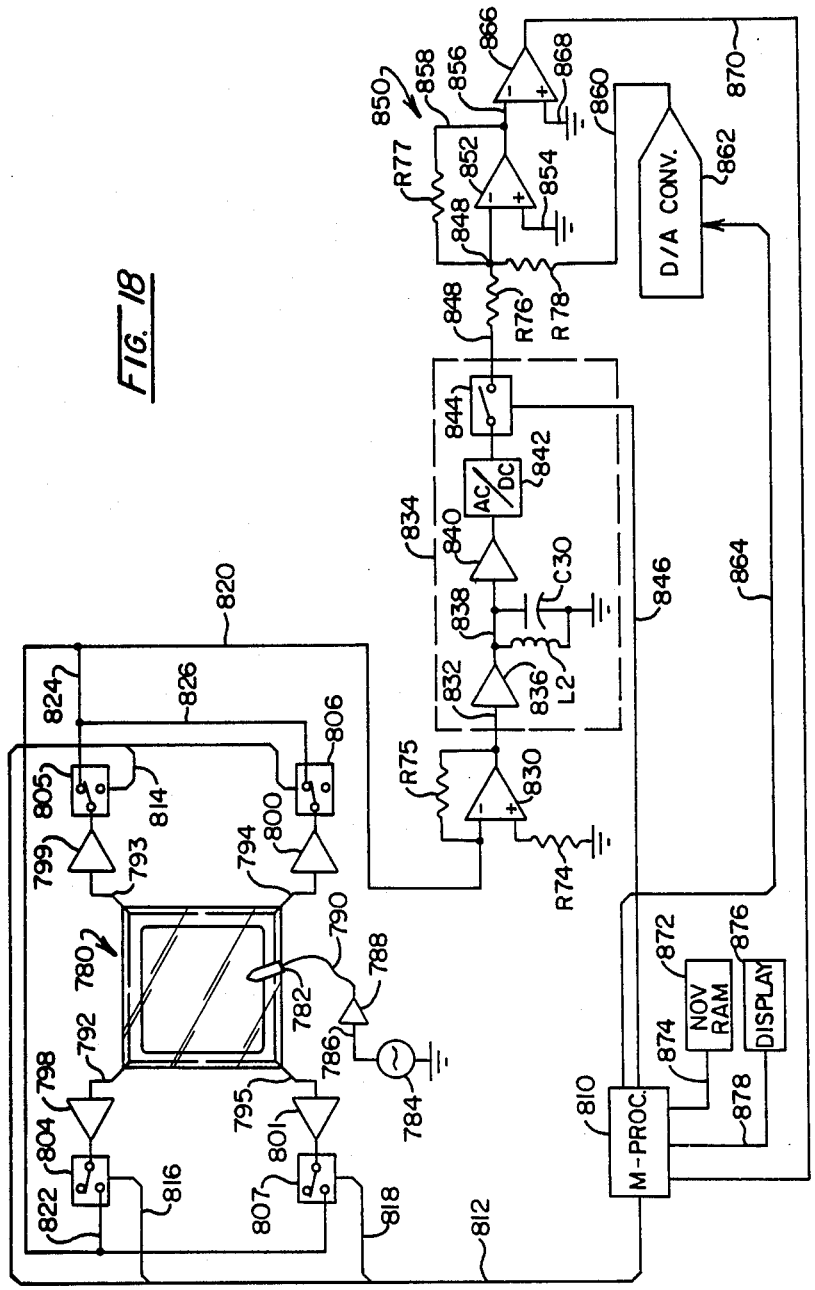
FIG. 18 is a schematic representation showing the circuit and switching components of another embodiment of the instant invention.

As indicated earlier herein, the digitizer technology of the invention also is capable of operating in a mode wherein excitation current is supplied from the locator or stylus itself. Looking to FIG. 18, a digitizer tablet is shown in general at 780. Tablet 780 is configured essentially identically as tablet 30 described above, however, the corner terminals or electrodes now are coupled with a receiving device or current-to-voltage converter. FIG. 18 shows the tablet 780 being directly accessed by contact with a stylus or similar locator 782. Stylus 82 is fed from an a.c. source of excitation represented at 784, the output of which extends via line 786 to a driver 788 thence via cable 790 to the contacting devcie 782. The corner terminals of tablet 780 are accessed via lines 792–795 which, respectively, extend to current-to-voltage receiving devices or converters 798–801. These devices 798–801 also exhibit a virtual ground to current injected to the resistance layer via device 782. The outputs of converters 798–801 are directed to respective solid-state switches 804–807 which, in turn, are controlled by a microprocessor driven control circuit represented at block 810. In this regard, the control is represented by lines 812, 814, 816, and 818. The voltage signal outputs collected from switches 804–807 are shown directed to line 820 from switch 807; to line 822 and 820 from switch 804; to line 824 and 820 from switch 805, and to lines 826 and 820 from switch 806. Line 820 is seen to be directed to one input of an amplification stage 830, the non-inverting input of which is coupled to ground through resistor R74 and the output of which at line 832 is coupled through feedback resistor R75 to input line 820. Output line 832, as before, is directed to a frequency selection network represented generally within dashed boundary 834 and which includes an initial voltage-to-current converter stage represented at 836, the output of which at line 838 is directed to a tank circuit including inductor L2 and capacitor C30. Line 838 is seen being directed to a buffer stage 840 and thence to an a.c.-to-d.c. converter represented at block 842. The resultant d.c. level then is directed to a sample and hold circuit represented at block 844 which is under the control of the microprocessor control function 810 as represented by line 846. As before, the output of sample and hold circuit 844 at line 846 is directed through a resistor R76 to a summing point 848 and thence to the input of a summing amplifier stage represented generally at 850. Stage 850 includes operational amplifier 852, the non-inverting input to which is coupled to ground via line 854 and the output of which at line 856 is coupled to a feedback path represented at line 858 which incorporates a resistor R77. Summing point 858 also receives a d.c. level signal of opposite polarity through resistor R78 within line 860. Line 860 receives a d.c. level signal from digital-to-analog converter 862 which is controlled, in turn, from microprocessor control function 810 as represented by line 864. The digitizing arrangement work, as before, through successive tests until a null condition is received at summing point 848. The results of this procedure are tested by a comparator 866 having its inverting input coupled with line 856 and its non-inverting input coupled with ground as represented at line 868. The output of the comparator at line 870 is redirected to the microprocessing function 810. As before, control function 810 additionally operates in conjunction with non-volatile NOV RAM to preserve tablet configuration as represented at block 872 and line 874. Further, the earlier-described LCD display shown in FIG. 4 at 42 is represented in the instant embodiment at block 876 which is shown associated with the control function at block 810 by a line 878.

Since certain changes may be made in the above-described system, method, and apparatus without departing from the scope of the invention herein, it is intended that all matter contained in the description thereof or shown in the accompanying drawings shall be interpreted as illustrative and not in a limiting sense.

I claim:

1. Apparatus of a type wherein a surface is selectively accessed with respect to positional data, comprising:
   an insulative substrate;
   a resistive layer supported upon said substrate having an operational region extending within an operational periphery of predetermined geometric pattern and configured to exhibit predetermined values of conductivity and resistivity; said operational periphery being spaced inwardly from an outer boundary;
   mutually spaced terminals supported upon said substrate positioned adjacent said outer boundary and the corners of said geometric pattern;
   means defining a conduction band exhibiting enhanced conductivity with respect to said operational region conductivity supported upon said substrate intermediate said outer boundary and said operational periphery;
   a plurality of spaced, discrete resistance elements, each in electrical communcation intermediate said conduction band and said resistive layer and each having a resistance value selected to effect exhibition of a substantially uniform electrical impedance of said layer to each said terminal;
   an excitation signal source;
   a ground reference;
   swich means actuable for applying said ground reference to first select ones of said terminals while, simultaneously applying said excitation signal source to second ones of said terminals oppositely disposed from said first ones; and
   control means for actuating said switch means to effect derivation of positional data modes.

2. The apparatus of claim 1 in which said value of each said discrete resistor component is selected in correspondence wiht the extent of voltage gradient distortion from linearity otherwise present at the location thereof during a said switch means actuation.

3. The apparatus of claim 1 in which said enhanced conductivity of said conduction band is selected having a ratio of conductivity with respect to the conductivity of said operational region conductivity of at least about 10:1.

4. The apparatus of claim 3 in which:
   said resistive layer and said conduction band are co-deposited having substantially equivalent thicknesses upon said substrate; and
   said conduction band includes a plurality of shorting bars selected to derive said ratio of conductivity.

5. The apparatus of claim 3 in which:
   said resistive layer, said conduction band and said resistive elements are formed of indium tin oxide codeposited upon said substrate; and
   said conduction band includes a plurality of shorting bars configured to derive said ratios of conductivity.

6. The apparatus of claim 4 in which:
   said conduction band is formed on said substrate as an elongate layer of indium tin oxide and said shorting bars are formed of substantially regularly spaced pairs of metallic conductors arranged transversely to said elongate layers.

7. The apparatus of claim 4 in which each said discrete resistive element is codeposited upon said substrate having said equivalent thickness and a widthwise extent selected to provide said resistance value.

8. The apparatus of claim 1 in which said predetermined geometric pattern is rectangular having four said corners.

9. The apparatus of claim 1 in which said switch means includes:
   a solid-state driver network coupled with each said terminal and responsive to a select drive input to effect application of said ground reference and excitation signal source; and
   solid-state switch means coupled with said excitation signal source and said ground reference, responsive to said control means actuation for providing said select drive output to each said driver network.

10. The apparatus of claim 1 in which said enhanced conductivity of said conduction band is selected to establish a ratio of the said conductivity thereof with respect to the said conductivity of said operational region of about 25:1.

11. The apparatus of claim 1 in which said enhanced conductivity of said conduction band is selected to establish a ratio of the said conductivity thereof with respect to the said conductivity of said operational region of about 50:1.

12. Apparatus of a type wherein a surface is selectively accessed with respect to positional data, comprising:
   an insulative substrate;
   a resistive layer supported upon said substrate having an operational region extending within an operational periphery of predetermined geometric pattern and configured to exhibit predetermined values of conductivity and resistivity, said operational periphery being spaced inwardly from an outer boundary;
   mutually spaced terminals supported upon said substrate and positioned adjacent said outer boundary and the corners of said predetermined geometric pattern to develop positional data modes;
   means defining a conduction band exhibiting enhanced conductivity with respect to said operational region conductivity, supported upon said substrate intermediate said outer boundary and said operational periphery;
   a plurality of spaced discrete resistance elements, each in electrical communication intermediate said conduction band and said resistive layer and each having a resistance of value selected to effect exhibition of a substantially uniform electrical impedance of said layer to each said terminal;
   a time varying excitation signal source for providing a first signal at a first select frequency and a secon signal at a second select frequency;
   switch means actuable for applying said first signal to first select ones of said terminals while, simultaneously, applying said second signal to second select ones of said terminals oppositely disposed from said first ones; and
   control means for actuating said switch means to effect derivation of said positional data modes.

13. The apparatus of claim 12 in which said enhanced conductivity of said conduction band is selected having a ratio of conductivity with respect to the conductivity of said operational region conductivity of at least about 10:1.

14. The apparatus of claim 13 in which:
   said resistive layer and said conduction band are co-deposited having substantially equivalent thicknesses upon said substrate; and
   said conduction band includes a plurality of shorting bars selected to derive said ratio of conductivity.

15. The apparatus of claim 13 in which:
   said resistive layers, said conduction band and said resistive elements are formed of indium tin oxide codeposited upon said substrate; and
   said conduction band includes a plurality of shorting bars configured to derive said ratios of conductivity.

16. The apparatus of claim 12 further comprising:
   locator means movable about said resistive layer in adjacency therewith at positions with respect thereto to provide position signals developed therefrom of said first and second select frequencies;
   signal treatment means responsive to said position signals for effecting the amplification thereof to provide corresponding first and second amplified signals;
   first filter means for filtering said first amplified signals in correspondence with said first frequency to provide first filtered signals;
   second filter means for filtering said second amplified signals in correspondence with said second frequency to provide second filtered signals; and
   converter means for converting said first and second filtered signals to corresponding first and second d.c. level position signals; and
   digital converter means for converting said first and second d.c. level position signals to corresponding first and second digital position signals.

17. Electrographic apparatus, comprising:
   an insulative substrate;
   a resistive layer supported upon said insulative substrate and extending in an x-coordinate sense between first parallel, spaced-apart borders and in a y-coordinate sense between second parallel, spaced-apart border to provide a rectangular resistive layer region having four corners and configured to exhibit predetermined values of resistivity and conductivity, said resistive layer region being spaced inwardly from an outer boundary;
   a terminal supported upon said substrate adjacent said outer boundary for interaction with said resistive layer region at each said corner;
   means defining an elongate conduction band exhibiting predetermined enhanced conductivity with respect to said conductivity of said resistive layer region, supported upon said substrate intermediate said outer boundary and said first and second parallel, spaced-apart borders;
   a plurality of discrete, spaced resistance elements, each in electrical communication intermediate said conduction band and said resistive layer region and each having a value of resistance selected to effect exhibition of a substantially uniform electrical impendance of said region to each said terminal
   an excitation signal source;
   a ground reference;
   switch means coupled with said terminals, said source and said ground reference and actuable to selectively apply said excitation signal and ground reference to said terminals;
   locator means movable into adjacency with said resistive layer for reacting therewith to develop position signals; and
   control means for actuating said switch means during a first data mode to apply said ground reference and excitation signal to first and second pairs of said terminals selected in said x-coordinate sense and, to apply said ground reference and excitation signal to third and fourth pairs. of said terminals selected in said y-coordinate sense during a second data mode, and including signal treatment means responsive to said position signals derived during said first and second data modes for deriving respective x-coordinate and y-coordinate signals.

18. The electrographic apparatus of claim 17 in which said enhanced conductivity of said conductor band is selected to establish a ratio of the said conductivity thereof with respect to the said conductivity of said resistive layer region of at least about 10:1.

19. The apparatus of claim 18 in which:
   said resistive layer and said conduction band are co-deposited having substantially equivalent thicknesses upon said substrate; and said conduction band includes a plurality of shorting bars selected to derive said ratio of conductivity.

20. The apparatus of claim 18 in which:
said resistive layer, said conduction band and said resistive elements are formed of indium tin oxide codeposited upon said substrate; and
said conduction band includes a plurality of shorting bars configured to derive said ratios of conductivity.

21. The apparatus of claim 20 in which said shorting bars are formed of substantially regularly spaced pairs of thin metallic conductors arranged transversely to the lengthwise extend of said elongate conduction band.

22. The apparatus of claim 17 in which said switch means includes:
a solid-state driver network coupled with each said terminal and responsive to a select drive input to effect application of said ground reference and excitation signal source; and
solid-state switch means coupled with said excitation signal source and said ground reference, responsive to said control means actuation for providing said select drive output to each said driver network.

23. Electrographic apparatus, comprising:
an insulative substrate;
a resistive layer supported upon said insulative substrate and extending in an x-coordinate sense between first parallel, spaced-apart borders and in a y-coordinate sense between second parallel, spaced-apart borders to provide a rectangular resistive layer region having four corners and configured to exhibit predetermined values of resistivity and conductivity, said resistive layer region being spaced inwardly from an outer boundary;
a terminal supported upon said substrate adjacent said outer boundary for interaction with said resistive layer region at each said corner;
means defining an elongate conduction band exhibiting enhanced conductivity with respect to said conductivity of said resistive layer region, supported upon said substrate intermediate said outer boundary and said first and second parallel, spaced-apart borders;
a plurality of discrete, spaced resistive elements, each in electrical communication intermediate said conduction band and said resistive layer region and each having a value of resistance selected to effect exhibition of a substantially uniform electrical impedance of said region with respect to each said terminal;
an excitation signal source deriving a first signal at a first select frequency and a second signal at a second select frequency;
switch means coupled with said terminals and said source and actuable to selectively apply said first and second excitation signals to said terminals;
control means for actuating said switch means during a first data mode to apply said first and second signals to first and second pairs of said terminals selected in said x-coordinate sense and to apply said first and second signals to third and fourth pairs of said terminals selected in said y-coordinate sense during a second data mode, and including signal treatment means responsive to said position signals derived during said first and second data modes for deriving respective x-coordinate and y-coordinate signals.

24. The electrographic apparatus of claim 23 in which said enhanced conductivity of said conduction band is selected to establish a ratio of the said conductivity thereof with respect to the said conductivity of said resistive layer region of at least about 10:1.

25. The apparatus of claim 24 in which:
said resistive layer and said conduction band are codeposited having substantially equivalent thicknesses upon said substrate; and
said conduction band includes a plurality of shorting bars selected to derive said ratio of conductivity.

26. The apparatus of claim 24 in which:
said resistive layer, said conduction band and said resistive elements are formed of indium tin oxide codeposited upon said substrate; and
said conduction band includes a plurality of shorting bars configured to derive said ratios of conductivity.

27. The apparatus of claim 26 in which said shorting bars are formed of substantially regularly spaced pairs of thin metallic conductors arranged transversely to the lengthwise extent of said elongate conduction band.

28. The apparatus of claim 23 in which said control means signal treatment means comprises:
input amplifier means responsive to said position signals for effecting the amplification therof to provide corresponding first and second amplified signals;
first filter means for filtering said first amplified signals in correspondence with said first frequency to provide first filtered signals;
second filter means for filtering said second amplified signals in correspondence with said second frequency to provide second filtered signals;
converter means for converting said first and second filtered signals to corresponding first and second d.c. level position signals; and
digital converter means for converting said first and second d.c. level position signals to corresponding first and second digital position signals representing respective said x-coordinate and y-coordinate signals.

29. Apparatus of a type wherein a surface is selectively accessed with respect to positional data, comprising:
an insulative substrate;
a resistive layer supported upon said substrate having an operational region extending within an operational periphery of predetermined geometric pattern and configured to exhibit predetermined values of conductivity and resistivity; said operational periphery being spaced inwardly from an outer boundary;
mutually spaced terminals supported upon said substrate, positioned adjacent said outer boundary the corners of said geometric pattern;
means defining an elongate conduction band exhibiting enhanced conductivity with respect to said operational region conductivity supported upon said substrate intermediate said outer boundary and said operational periphery;
a plurality of spaced, discrete resistance elements, each in electrical communication intermediate said conduction band and said resistive layer and each having a resistance of value selected to effect exhibition of a substantially uniform electrical impedance of said layer to each said terminal;
an excitation signal source;

locator means coupled with said excitation signal source and movable into contacting adjacency with said resistive layer for applying said source thereto at a select location;

current to voltage converter means coupled with each said terminal, exhibiting a virtual ground thereto and having position output signals in response to said source application by said locator means;

switch means actuable for collecting select said position output signals in accordance with predetermined positional data modes; and control means for actuating said switch means in accordance with said data modes and for treating said collected position output signals to derive x- and y-coordinate signals corresponding with said locator means select location.

30. The apparatus of claim 29 in which said enhanced conductivity of said conduction band is selected having a ratio of conductivity with respect to the conductivity of said operational region conductivity of at least about 10:1.

31. The apparatus of claim 30 in which:
said resistive layer, said conduction band, and resistance elements are codeposited upon said substrate having substantially equivalent thicknesses; and
said conduction band is elongate and includes a plurality of shorting bars selected to derive said ratio of conductivity.

32. The apparatus of claim 31 in which said shorting bars are formed of substantially regularly spaced pairs of thin metallic conductors arranged transversely to the lengthwise extent of said elongate conduction band.

33. Electrographic apparatus, comprising:
an insulative substrate;
a resistive layer supported upon said insulative substrate and extending in an x-coordinate sense between first parallel, spaced-apart borders and in a y-coordinate sense between second parallel, spaced-apart borders to provide a rectangular resistive layer region having four corners and configured to exhibit predetermined values of resistivity and conductivity, said resistive layer region being spaced inwardly from an outer boundary;
a terminal supported upon said substrate adjacent said outer boundary for interaction with said resistive layer region at each said corner;
means defining an elongate conduction band exhibiting enhanced conductivity with respect to said conductivity of said resistive layer region, supported upon said substrate intermediate said outer boundary and said first and second parallel, spaced-apart borders;
a plurality of discrete, spaced resistance elements, each in electrical communication intermediate said conduction band and said resistive layer region and each having a value of resistance selected to effect exhibition of a substantially uniform electrical impendance of said region to each said terminal;
an excitation signal source;
locator means coupled with said excitation signal source and movable into adjacency with said resistive layer for reacting in signal transfer relationship therewith at a select location;
current to voltage converter means coupled with each said terminal, exhibiting a virtual ground thereto and having position output signals in response to said locator means reaction;

switch means actuable for collecting select said position output signals; and control means for actuating said switch means during a first data mode to effect collection of said position output signals from first and second pairs of said terminals selected in said x-coordinate sense and to effect collection of said position output signals from third and fourth pairs of said terminals selected in said y-coordinate sense during a second data mode, and including signal treatment means responsive to said collected position signals derived during said first and second data modes for deriving respective x-coordiante and y-corrdiante signals.

34. The apparatus of claim 33 in which said enhanced conductivity of said conduction band is selected having a ratio of conductivity with respect to the conductivity of said operational region conductivity of at least about 10:1.

35. The apparatus of claim 34 is which:
said resistive layer, said conduction band, and resistance elements are codeposited upon said substrate having substantially equivalent thicknesses; and
said conduction band is elongate and includes a plurality of shorting bars selected to derive said ratio of conductivity.

36. The apparatus of claim 34 in which said shorting bars are formed of substantially regularly spaced pairs of thin metallic conductors arranged transversely to the lengthwise extent of said elongate conduction band.

37. A digitizer tablet of a variety wherein an electrically active surface is accessed by a locator to effect the generation of coordinate pair signals which are converted to coordinate pair digital values by a signal treatment circuit and wherein a microprocessor having memory converts said digital values to digital outputs in correspondence with operator selected received configuration parameters, the improvement comprising:
a readout mounted upon said tablet for observation by said operator;
a menu signal region designated upon said active surface and accessible in signal transfer relationship by said locator;
said memory retaining said configuration parameters including mode of operation, scale units and coordiante speed;
said microprocessor being responsive to said signal tranfer at said menu signal region for effecting a menu selection display at said readout for prompting said operator to select derived said configuration parameters by select movement of said locator upon said active surface.

38. The method for converting voltage gradient distortion from rectilinearity in an electrographic device formed of an insulative substrate supporting a resistive layer of rectangular shape within a predetermined periphery of parallel borders, said layer exhibiting predetermined resistivity and corresponding conductivity and having access terminals at each corner of said rectangualr shape comprising the steps of:
providing four elongate narrow conduction bands of conductivity enhanced by ratio of at least 10:1 with respect to the said conductivity of said resistive layer, substantially parallel with and in spaced adjacency from each said resistive layer parallel border and in electrical communication with adjacent said terminals; and providing a plurality of discrete, spaced resistive components intermediate each said conduction band and an adjacent said parallel border, each said resistive component having a resistance value selected such that the impedances witnessed between each and the said terminal closest thereto are substantially equal.

39. The method of claim 38 wherein each said conduction band is provided as a deposit of indium-tin-oxide and said ratio or conductivity is developed by the provision of a plurality of spaced shorting bars in electrical communication therewith.

40. The method of claim 39 in which said shorting bars are configured substantially as pairs of spaced bars perpendicular to said elongate conduction band and having said conduction band indium-tin-oxide deposited intermediate each said pair.

41. The method of claim 38 in which said ratio is about 50:1.

42. The method of claim 38 wherein said resistance components are provided as deposits upon said substrate of indium-tin-oxide having thickness selected to derive each said resistance value.

* * * * *